(12) United States Patent
Mceldowney et al.

(10) Patent No.: US 11,567,332 B2
(45) Date of Patent: Jan. 31, 2023

(54) LIGHT GUIDE DISPLAY ASSEMBLY FOR PROVIDING EXPANDED FIELD OF VIEW

(71) Applicant: Meta Platforms Technologies, LLC, Menlo Park, CA (US)

(72) Inventors: Scott Charles Mceldowney, Redmond, WA (US); Babak Amirsolaimani, Redmond, WA (US); Yun-Han Lee, Redmond, WA (US); Lu Lu, Kirkland, WA (US); Mengfei Wang, Woodinville, WA (US); Junren Wang, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/706,581

(22) Filed: Mar. 28, 2022

(65) Prior Publication Data

US 2022/0221725 A1 Jul. 14, 2022

Related U.S. Application Data

(63) Continuation of application No. 17/005,252, filed on Aug. 27, 2020, now Pat. No. 11,314,093.

(51) Int. Cl.
*G02B 27/01* (2006.01)
*F21V 8/00* (2006.01)

(52) U.S. Cl.
CPC ....... *G02B 27/0172* (2013.01); *G02B 6/0056* (2013.01); *G02B 6/0076* (2013.01); *G02B 2027/0125* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| | | |
|---|---|---|
| 10,495,798 B1 | 12/2019 | Peng et al. |
| 10,545,348 B1 | 1/2020 | Lu et al. |
| 2014/0140653 A1 | 5/2014 | Brown et al. |
| 2014/0140654 A1 | 5/2014 | Brown et al. |

(Continued)

OTHER PUBLICATIONS

International Search Report and Written Opinion for International Application No. PCT/US2021/047688, dated Dec. 10, 2021, 11 pages.

*Primary Examiner* — Jerry Rahll
(74) *Attorney, Agent, or Firm* — Millburn IP PLLC

(57) ABSTRACT

A device includes a light guide. The device also includes a first in-coupling element configured to couple a first input light into the light guide, and a first out-coupling element configured to couple the first input light out of the light guide as a first output light having a first output field of view ("FOV"). The device also includes a second in-coupling element configured to couple a second input light into the light guide. The device further includes a second out-coupling element configured to couple the second input light out of the light guide as a second output light having a second output FOV substantially non-overlapping with the first output FOV. A combination of the first and second output FOVs is larger than at least one of the first or second output FOV, and the first and second input lights have orthogonal polarizations.

20 Claims, 12 Drawing Sheets

(56) References Cited

U.S. PATENT DOCUMENTS

| | | |
|---|---|---|
| 2014/0160543 A1 | 6/2014 | Putilin et al. |
| 2018/0052276 A1 | 2/2018 | Klienman et al. |
| 2018/0113309 A1 | 4/2018 | Robbins et al. |
| 2018/0239177 A1 | 8/2018 | Oh |
| 2018/0275350 A1* | 9/2018 | Oh .................... G02B 6/10 |
| 2018/0284884 A1 | 10/2018 | Sulai et al. |
| 2019/0353898 A1 | 11/2019 | Amirsolaimani et al. |
| 2020/0018962 A1 | 1/2020 | Lu et al. |
| 2020/0049992 A1 | 2/2020 | Peng et al. |
| 2020/0271850 A1 | 8/2020 | Vora et al. |
| 2020/0278554 A1 | 9/2020 | Schultz et al. |
| 2020/0310024 A1 | 10/2020 | Danziger et al. |
| 2020/0371388 A1 | 11/2020 | Geng et al. |
| 2020/0393690 A1 | 12/2020 | Lee et al. |
| 2021/0223549 A1 | 7/2021 | Maimone et al. |

\* cited by examiner

800

---

Couple a first light having a first polarization and a first input FOV into one or more light guides as a first total internal reflection ("TIR") propagating light — 810

↓

Couple a second light having a second polarization and a second input FOV into the one or more light guides as a second TIR propagating light — 820

↓

Couple the first TIR propagating light out of the one or more light guides as a first output light corresponding to a first output FOV — 830

↓

Couple the second TIR propagating light out of the one or more light guides as a second output light corresponding to a second output FOV — 840

FIG. 8

LIGHT GUIDE DISPLAY ASSEMBLY FOR PROVIDING EXPANDED FIELD OF VIEW

CROSS REFERENCE TO RELATED APPLICATION

This application is a continuation of U.S. patent application Ser. No. 17/005,252, entitled "LIGHT GUIDE DISPLAY ASSEMBLY FOR PROVIDING EXPANDED FIELD OF VIEW," filed on Aug. 27, 2020, the content of which is incorporated herein by reference in its entirety.

TECHNICAL FIELD

The present disclosure relates generally to devices and, more specifically, to a light guide display assembly for providing an expanded field of view.

BACKGROUND

Near-eye displays ("NEDs") have been widely implemented in a variety of applications, such as video playback, gaming, and sports. NEDs have been used to realize virtual reality ("VR"), augmented reality ("AR"), or mixed reality ("MR"). AR or MR headsets display a virtual image overlapping with real-world images or see-through images. Pupil-expansion light guide display systems or assemblies with diffractive coupling structures are promising designs for NEDs, which can potentially offer sun/eye-glasses form factors, a moderately large field of view ("FOV"), a high transmittance, and a large eye-box. A light guide display system includes a display element that generates an image light representing a virtual image, and a light guide coupled with diffractive coupling structures to guide the image light to an eye-box of the light guide display system. The diffractive coupling structures functioning as an out-coupling diffractive element replicate the virtual image at the output side of the light guide to expand an effective pupil. The light guide coupled with diffractive coupling structures may also function as an optical combiner to combine the image light and a light from the real world, such that the virtual image represented by the image light generated by the display element is overlapped or superimposed with a real-world image represented by the light from the real world.

SUMMARY OF THE DISCLOSURE

Consistent with a disclosed embodiment of the present disclosure, a device is provided. The device includes one or more light guides. The device also includes a first in-coupling element configured to couple a first light having a first input field of view ("FOV") into a first light guide. The device also includes a second in-coupling element configured to couple a second light having a second input FOV into a second light guide. The device also includes a first out-coupling element configured to couple the first light out of the first light guide as a first output light having a first output FOV. The device further includes a second out-coupling element configured to couple the second light out of the second light guide as a second output light having a second output FOV substantially non-overlapping with the first output FOV. A combination of the first output FOV and the second output FOV is larger than at least one of the first output FOV or the second output FOV.

Consistent with a disclosed embodiment of the present disclosure, a method is provided. The method includes coupling a first light having a first input field of view ("FOV") into a first light guide and coupling the first light out of the first light guide as a first output light having a first output FOV. The method also includes coupling a second light having a second input FOV into a second light guide and coupling the second light out of the second light guide as a second output light having a second output FOV substantially non-overlapping with the first output FOV. A combination of the first output FOV and the second output FOV is larger than at least one of the first output FOV or the second output FOV.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 8 is a flowchart illustrating a method for providing an expanded FOV, according to an embodiment of the present disclosure.

DETAILED DESCRIPTION

Figure 1A:
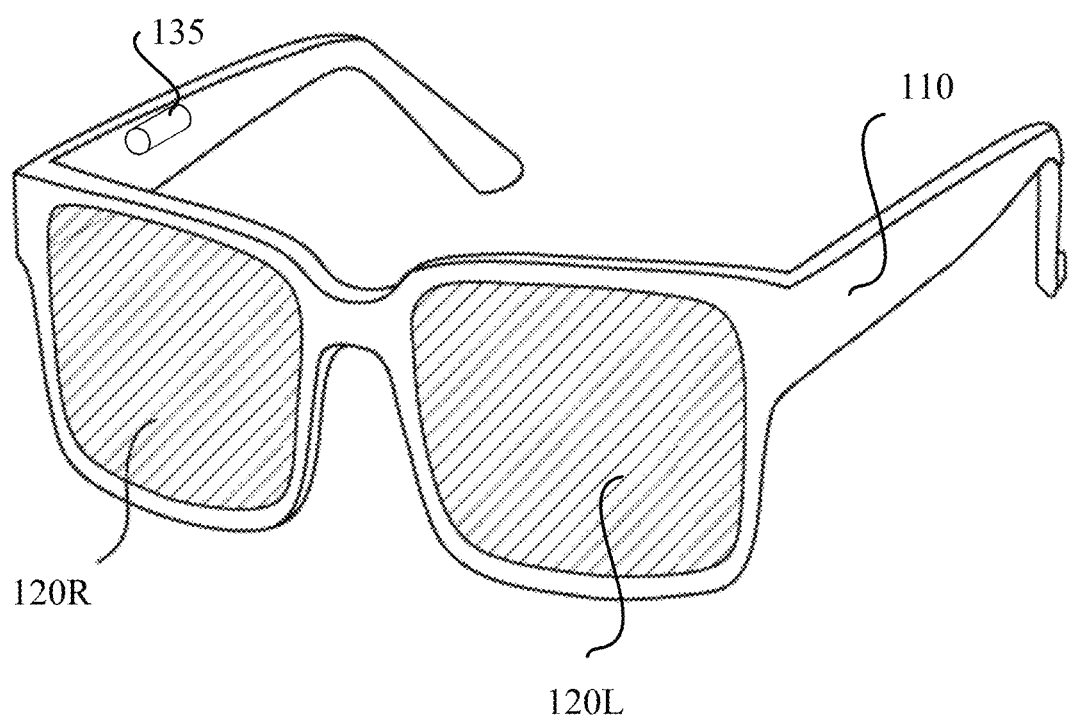
FIG. 1A illustrates a schematic diagram of a near-eye display ("NED"), according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film" and "layer" may include rigid or flexible, self-supporting or free-standing film, coating, or layer, which may be disposed on a supporting substrate or between substrates. The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" indicates a direction that is non-parallel to the plane of the film or layer (e.g., perpendicular to the surface plane of the film or layer, e.g., perpendicular to a plane parallel to the surface plane). For example, when an "in-plane" direction refers to a direction within a surface plane, an "out-of-plane" direction may refer to a thickness direction perpendicular to the surface plane, or a direction that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handednesses (e.g., a left-handed circularly polarized light and a right-handed circularly polarized light).

In conventional light guide (may also be referred to as waveguide) display systems or assemblies, a light may propagate within a light guide through total internal reflection ("TIR"), when an incidence angle at an inner surface of the light guide (e.g., an angle between the light incident onto the inner surface and a normal of the inner surface) is greater than or equal to a critical angle. The critical angle may be determined by a refractive index of a material from which the light guide is fabricated (provided that an outside environment of the light guide is air with a refractive index of about 1.0). For example, the critical angle for a BK-7 glass is about 42°. The critical angle may be reduced by disposing a reflective coating at a surface of the light guide or by using a material having a higher refractive index to fabricate the light guide. When the critical angle is reduced, the FOV provided by the light guide may be increased. However, adding a reflective coating or using a material having a higher reflective index may increase the cost and weight of the light guide. When the light propagates within the light guide through TIR, the angle formed by the TIR path of a light/ray and the normal of the inner surface of the light guide (or the incidence angle of the light/ray incident onto the inner surface of the light guide) may be referred to as a guided angle or a propagation angle. For light guides fabricated from conventional glass materials (e.g., BK-7 glass), a maximum value of the propagation angle at which a light can propagate within the light guide through TIR is about 50°.

In view of the limitations on the FOV in a conventional light guide display system, the present disclosure provides a device (e.g., an optical device) or a light guide display assembly that includes a light guide (or a light guide stack) and one or more polarization selective elements coupled to the light guide (or the light guide stack). The polarization selective elements may function as in-coupling elements and/or out-coupling elements coupled with the light guide (or the light guide stack). An in-coupling element or an out-coupling element may also be referred to as a polarization selective in-coupling element or out-coupling element. The light guide coupled with the one or more polarization selective elements may guide an image light representing a virtual image generated by a light source assembly to an eye-box of the optical device in a polarization multiplexing manner and/or in a time multiplexing manner. The optical device may provide an increased (or expanded) FOV at the eye-box compared to an FOV of the image light representing the virtual image coupled into the light guide. For convenience of discussion, the FOV of the image light input into the light guide may be referred to as the input FOV, and the FOV of the image light output from the light guide may be referred to as the output FOV. The optical device of the present disclosure can provide an increased output FOV (i.e., the output FOV is larger than the input FOV). In some embodiments, any of the polarization selective elements may include one or more polarization selective gratings or holographic elements fabricated based on isotropic or anisotropic materials. The polarization selective gratings or holographic elements may include suitable sub-wavelength structures, liquid crystals, photo-refractive holographic materials, or any combination thereof. In some embodiments, at least one of the polarization selective in-coupling element or the polarization selective out-coupling element may be a linear-polarization selective element. In some embodiments, at least one of the polarization selective in-coupling element or the polarization selective out-coupling element may be a circular-polarization selective element.

In some embodiments, the optical device may include a light guide. The optical device may include a first polarization selective in-coupling element (e.g., a first polarization selective in-coupling grating) configured to respectively couple (e.g., via diffraction) a first input light having a first polarization and a first input FOV into a TIR path inside the light guide. The optical device may also include a second polarization selective in-coupling element (e.g., a second polarization selective in-coupling grating) configured to couple a second input light having a second polarization orthogonal to the first polarization and having a second input FOV into a TIR path inside the light guide. The first and second input lights may propagate within the light guide through TIR as a first TIR propagating light and a second TIR propagating light. The optical device may also include a first polarization selective out-coupling element (e.g., a first polarization selective out-coupling grating) configured to couple the first TIR propagating light out of the light guide as a first output light having a first output FOV. The optical device may include a second polarization selective out-coupling element (e.g., a second polarization selective out-coupling grating) configured to couple the second TIR propagating light out of the light guide as a second output light having a second output FOV. The first output light and the second output light may have orthogonal polarizations. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV and the second output FOV may be larger than the combination of the first input FOV and the second input FOV.

In some embodiments, the optical device may include a light guide stack including a plurality of light guides. For example, the light guide stack may include a first light guide and a second light guide. A first polarization selective in-coupling element (e.g., a first polarization selective in-coupling grating) and a first polarization selective out-coupling element (e.g., a first polarization selective out-coupling grating) may be coupled to the first light guide. A second polarization selective in-coupling element (e.g., a second polarization selective in-coupling grating) and a second polarization selective out-coupling element (e.g., a second polarization selective out-coupling grating) may be coupled to the second light guide. The first polarization selective in-coupling element (e.g., a first polarization selective in-coupling grating) may be configured to couple (e.g., via diffraction) a first input light with a first input FOV into a first TIR path within the first light guide as a first TIR propagating light. The first TIR propagating light may propagate along the first TIR path within the first light guide toward the first polarization selective out-coupling element.

The first polarization selective out-coupling element (e.g., a first polarization selective out-coupling grating) may be configured to couple (e.g., via diffraction) the first TIR propagating light out of the first light guide as a first output light corresponding to a first output FOV. The second polarization selective in-coupling element (e.g., a second polarization selective in-coupling grating) may be configured to couple (e.g., via diffraction) a second input light with a second input FOV into a second TIR path within the second light guide as a second TIR propagating light. The second TIR propagating light may propagate along the second TIR path within the second light guide through the TIR. The second polarization selective out-coupling element (e.g., a second polarization selective out-coupling grating) may be configured to couple (e.g., via diffraction) the second TIR propagating light out of the second light guide as a second output light corresponding to a second output FOV. The first output light and the second output light may have orthogonal polarizations. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first input FOV and the second input FOV. In some embodiments, the combination of the first output FOV and the second output FOV may be larger than the combination of the first input FOV and the second input FOV.

In some embodiments, the first and second input lights may correspond to different portions of a same FOV of a light (or image light) emitted from a light source coupled to the light guide or the light guide stack. The image light emitted from the light source may represent a virtual image. For example, the FOV of the image light may include two portions, a first portion and a second portion (e.g., a left half and a right half). The first portion and the second portion of the FOV may be correspond to the first input FOV and the second input FOV of the first input light and the second input light. The light guide or the light guide stack may be configured to receive the first and second input lights corresponding to different portions of the FOV during a same time period (e.g., simultaneously within the same time period) or in a time-sequential manner (e.g., one light being received before the other at two sequential time instances).

In some embodiments, each of the first and second input lights may correspond to a full FOV of the image light (representing the virtual image) emitted from the light source coupled to the light guide or the light guide stack. That is, the first input FOV of the first input light may correspond to the full FOV of the image light emitted by the light source, and the second input FOV of the second input light may correspond to the full FOV of the image light emitted by the light source. The light guide or the light guide stack may be configured to receive the first and second input lights each corresponding to the full FOV of the image light in a time-sequential manner (e.g., one input light may be received before the other input light at two sequential time instances). In some embodiments, a combination of the first output FOV and the second output FOV at the output side of the light guide display assembly may be larger than the FOV of the image light generated by the light source. In some embodiments, the first TIR propagating light inside the light guide may correspond to a first intermediate FOV that is smaller than the first input FOV of the first input light. The second TIR propagating light inside the light guide may correspond to a second intermediate FOV that is smaller than the second input FOV of the second input light. The combination of the first output FOV and the second output FOV at the output side of the light guide display assembly may be larger than a combination of the first intermediate FOV and the second intermediate FOV of the first and second TIR propagating lights inside the light guide. In some embodiments, the combination of the first output FOV and the second output FOV at the output side of the light guide display assembly may be larger than each of the first input FOV and the second input FOV (each corresponding to the full FOV of the image light emitted by the light source).

In some embodiments, at least one first TIR propagating ray included in the first TIR propagating light and at least one second TIR propagating ray included in the second TIR propagating light may have a substantially same propagation angle when propagating within the light guide through TIR. In some embodiments, the first polarization selective out-coupling element may be configured to couple the at least one first TIR propagating ray out of the light guide (or the first light guide included in the light guide stack) as at least one first output ray propagating in at least one first direction (or first output angle). In some embodiments, the second polarization selective out-coupling element may be configured to couple the at least one second TIR propagating ray out of the light guide (or the second light guide included in the light guide stack) as at least one second output ray propagating in at least one second direction (or second output angle). An output angle may be defined as an angle between the output ray and a normal of a surface of an out-coupling element. The output angle may be defined as positive or negative depending on the clockwise or counter-clockwise relationship between the output ray and the normal of the surface of the out-coupling element. The first direction (or the first output angle) and the second direction (or the second output angle) may be different directions (or different output angles). In some embodiments, the first output angle and second output angle may be opposite output angles. For example, the first output angle and second output angle may have the same absolute value and opposite signs (e.g., $\theta$ and $-\theta$). In some embodiments, the first output angle and the second output angle may have different absolute values and opposite signs (e.g., $\theta 1$ and $-\theta 2$, with $\theta 1$ and $\theta 2$ having different values).

In a conventional light guide display assembly, the propagation angle of a TIR path within the light guide may correspond, one-to-one, to the output angle of an output ray out-coupled from the light guide. In the present disclosure, a propagation angle of the TIR path within the light guide may be mapped to two different output angles, e.g., two output angles having opposite signs. Thus, the FOV provided by the disclosed light guide display assembly may be enlarged, increased, or expanded (e.g., doubled) compared to an FOV provided by a conventional light guide display assembly when light guides (or light guide stacks) included in the assemblies are fabricated with a similar or same material having a similar or same refractive index. Compared to the conventional light guide display assembly, the disclosed light guide display assembly may provide a same or similar FOV with a light guide fabricated from a material having a lower refractive index.

In some embodiments, when a single light guide is used for delivering two different portions of the FOV of the image light generated by a light source assembly, a multi-color (e.g., full-color) 2D pupil expansion (or replication) may be achieved by stacking three light guides configured to deliver component color images (e.g., primary color images) by in-coupling and subsequently out-coupling, e.g., red, green, and blue lights, respectively, in any suitable order. In some embodiments, when a single light guide is used for delivering different portions of the FOV of the image light, a multi-color (e.g., full-color) 2D pupil expansion (or replication) may be achieved by stacking two light guides configured to deliver component color images (e.g., primary color images) by in-coupling and subsequently out-coupling, e.g., a combination of red and green lights, and a combination of green and blue lights, respectively, in any suitable order.

In some embodiments, when a single light guide stack having a plurality of light guides stacked together is used for delivering two different portions of the FOV of the image light, a multi-color (e.g., full-color) 2D pupil expansion (or replication) may be achieved by stacking three light guide stacks configured to deliver component color images (e.g., primary color images) by in-coupling and subsequently out-coupling, e.g., red, green, and blue lights, respectively, in any suitable order. In some embodiments, when a single light guide stack is used for delivering different portions of the FOV of the image light, a multi-color (e.g., full-color) 2D pupil expansion (or replication) may be achieved by stacking two light guide stacks configured to deliver component color images (e.g., primary color images) by in-coupling and subsequently out-coupling, e.g., a combination of red and green lights, and a combination of green and blue lights, respectively, in any suitable order.

FIG. 1A illustrates a schematic diagram of a near-eye display ("NED") 100 according to an embodiment of the present disclosure. In some embodiments, the NED 100 may be referred to as a head-mounted display ("HMD"). The NED 100 may present media content to a user, such as one or more images, videos, audios, or a combination thereof. In some embodiments, audio content may be presented to the user via an external device (e.g., a speaker and/or a headphone). The NED 100 may operate as a VR device, an AR device, an MR device, or a combination thereof. In some embodiments, when the NED 100 operates as an AR and/or MR device, a portion of the NED 100 may be at least partially transparent, and internal components of the NED 100 may be at least partially visible.

As shown in FIG. 1A, the NED 100 may include a frame 110, a left display system 120L and a right display system 120R. In some embodiments, one or more devices shown in FIG. 1A may be omitted. In some embodiments, one or more additional devices or components not shown in FIG. 1A may also be included in the NED 100. The frame 110 may include a suitable type of mounting structure configured to mount the left display system 120L and the right display system 120R to a body part (e.g. a head) of the user (e.g., adjacent eyes of the user). The frame 110 may be coupled to one or more optical elements, which may be configured to display media content to the user. In some embodiments, the frame 110 may represent a frame of eye-wear glasses. The left display system 120L and the right display system 120R may be configured to enable the user to view virtual content presented by the NED 100 and/or to view images of real-world objects. For example, in some embodiments, each of the left display system 120L and the right display system 120R may include a see-through optical element. In some embodiments, the left display system 120L and the right display system 120R may include any suitable display assembly (not shown) configured to generate a light (e.g., an image light corresponding to a virtual image) and to direct the image light to an eye of the user. In some embodiments, the NED 100 may include a projection system. For illustrative purposes, FIG. 1A shows that the projection system may include a projector 135 coupled to the frame 110.

Figure 1B:
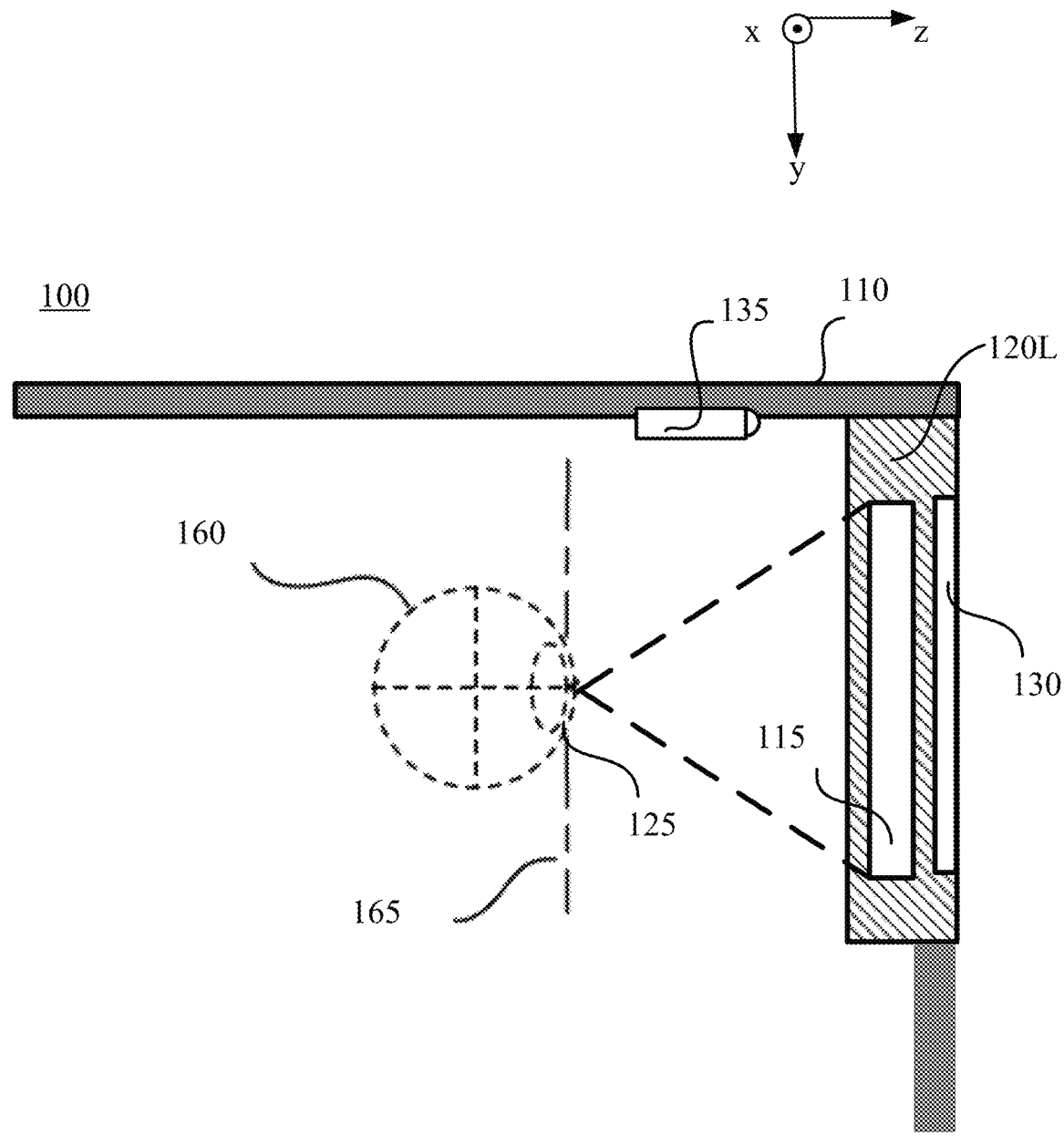
FIG. 1B illustrates a cross-sectional view of half of the NED shown in FIG. 1A, according to an embodiment of the present disclosure.

FIG. 1B is a cross-sectional view of the NED 100 shown in FIG. 1A according to an embodiment of the present disclosure. For purposes of illustration, FIG. 1B shows the cross-sectional view associated with the left display system 120L of the NED 100. The cross-sectional view of the right display system 120R may be similar to that shown for the left display system 120L. As shown in FIG. 1B, for an eye 160, the left display system 120L may include an optical device 115 for delivering an image light with an expanded field of view ("FOV") to the eye 160. In some embodiments, the optical device 115 may be a light guide display assembly 115. The light guide display assembly 115 may include a light guide or a stack of light guides. An exit pupil 125 may be a location where an eye 160 is positioned in an eye-box 165 when the user wears the NED 100. For illustrative purposes, FIG. 1B shows the cross-sectional view associated with a single eye 160 and a single light guide display assembly 115. In some embodiments, another light guide display assembly that is separate from and similar to the light guide display assembly 115 shown in FIG. 1B, may provide an image light to an eye-box located at an exit pupil of another eye of the user.

The light guide display assembly 115 may include a light guide and/or one or more gratings fabricated based on one or more materials (e.g., a plastic, a glass, etc.) with one or more refractive indices. The light guide display assembly 115 may effectively minimize the weight and increase (or expand) the field of view ("FOV") of the NED 100. In some embodiments, the light guide display assembly 115 may be a component of the NED 100. In some embodiments, the light guide display assembly 115 may be a component of some other NED, or other system that directs an image light to a particular location. As shown in FIG. 1B, the light guide display assembly 115 may be provided for one eye 160 of the user. The light guide display assembly 115 for one eye may be separated or partially separated from a similar light guide display assembly for the other eye. In certain embodiments, a single light guide display assembly 115 may be used for both eyes of the user.

In some embodiments, the NED 100 may include one or more optical elements (not shown) disposed between the light guide display assembly 115 and the eye 160. The optical elements may be configured to, e.g., correct aberrations in an image light emitted from the light guide display assembly 115, magnify an image light emitted from the light guide display assembly 115, or perform another type of optical adjustment of an image light emitted from the light guide display assembly 115. Examples of the one or more optical elements may include an aperture, a Fresnel lens, a convex lens, a concave lens, a filter, any other suitable optical element that affects an image light, or a combination thereof. In some embodiments, the light guide display assembly 115 may include a stack of light guide displays. In some embodiments, the stacked light guide displays may include a polychromatic display (e.g., a red-green-blue ("RGB") display) formed by stacking light guide displays. Respective monochromatic light sources included in the light guide displays may be configured to emit lights of different colors. For example, the stacked light guide displays may include a polychromatic display configured to project image lights on multiple planes (e.g., multi-focus colored display). In some embodiments, the stacked light guide displays may include a monochromatic display configured project an image light on multiple planes (e.g., multi-focus monochromatic display). Various embodiments of the light guide display assembly 115 are described below.

In some embodiments, the NED 100 may include an adaptive dimming element 130, which may dynamically adjust the transmittance of real-world lights from the real-world environment, thereby switching the NED 100 between a VR device and an AR device or between a VR device and an MR device. In some embodiments, along with switching between the AR/MR device and the VR device, the adaptive dimming element 130 may be used in the AR and/MR device to mitigate difference in brightness of real and virtual objects.

Figure 2A:
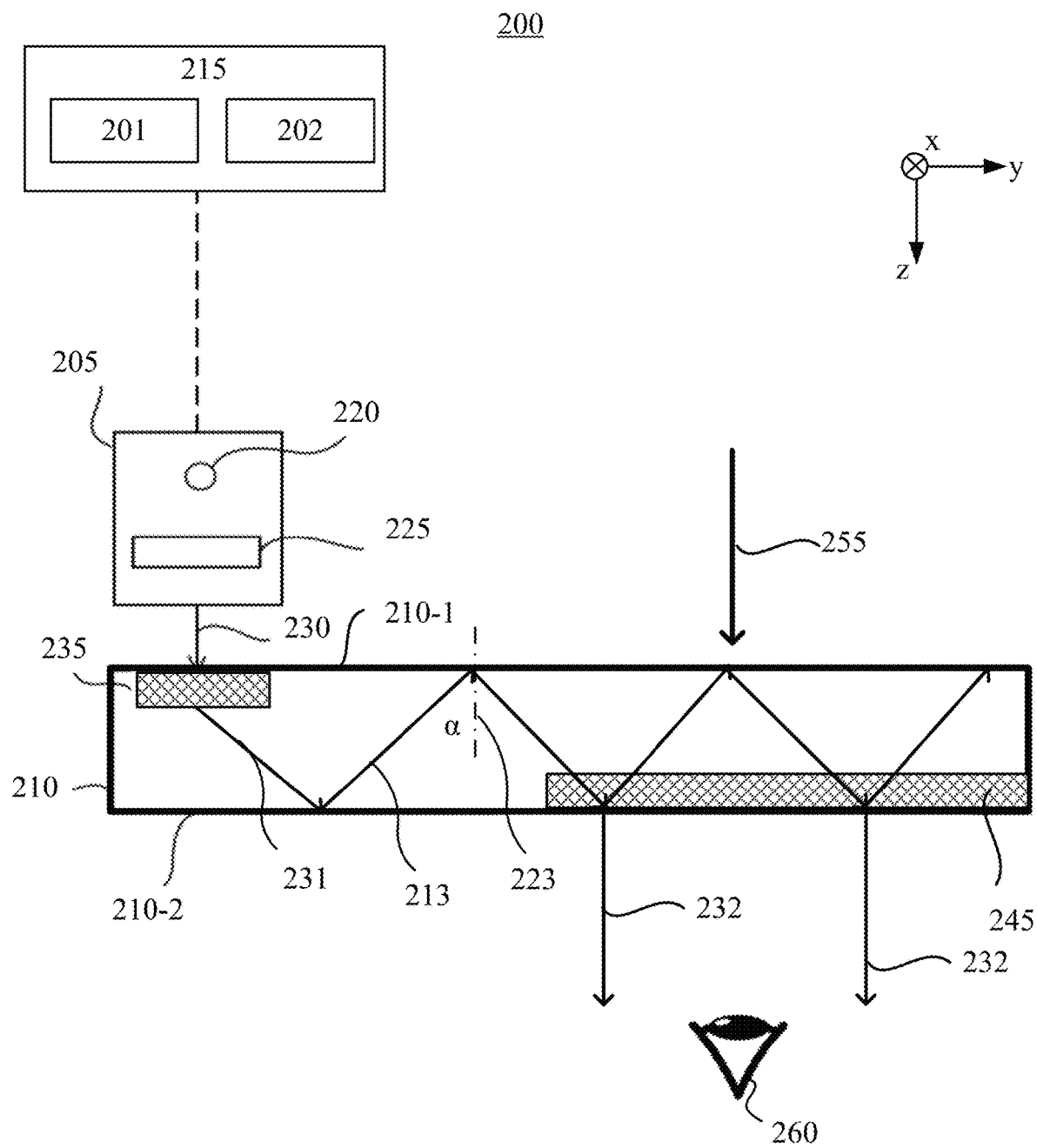
FIG. 2A illustrates a schematic diagram of a light guide display assembly, according to an embodiment of the present disclosure.

FIG. 2A illustrates a schematic diagram of an optical system or device 200 according to an embodiment of the present disclosure. The optical device 200 may also be referred to as a light guide display assembly (or light guide display system) 200. The light guide display assembly 200 may be implemented in NEDs for VR, AR, and/or MR applications, such as the NED 100 shown in FIGS. 1A and 1B. For example, the light guide display assembly 200 may be an embodiment of (or may be similar to) the light guide display assembly 115 shown in FIGS. 1A and 1B.

As shown in FIG. 2A, the light guide display assembly 200 may include a light source assembly 205, a light guide 210, and a controller 215. The controller 215 may include a processor or processing unit 201. The processor may by any suitable processor, such as a central processing unit ("CPU"), a graphic processing unit ("GPU"), etc. The controller 215 may include a storage device 202. The storage device 202 may be a non-transitory computer-readable medium, such as a memory, a hard disk, etc. The storage device 202 may be configured to store data or information, including computer-executable program instructions or codes, which may be executed by the processor 201 to perform various controls or functions of the methods or processes disclosed herein.

The light source assembly 205 may include a light source 220 and light conditioning system 225. The light source 220 may be any suitable light source configured to generate a light, such as an image light representing a virtual image and having a predetermined FOV. In some embodiments, the light source 220 may be a light source configured to generate a coherent or partially coherent light. The light source 220 may include, e.g., a laser diode, a vertical cavity surface emitting laser, a light emitting diode, or a combination thereof. In some embodiments, the light source 220 may include a display panel, such as a liquid crystal display ("LCD") panel, an liquid-crystal-on-silicon ("LCoS") display panel, an organic light-emitting diode ("OLED") display panel, a micro light-emitting diode ("micro-LED") display panel, a digital light processing ("DLP") display panel, or a combination thereof. In some embodiments, the light source 220 may include a self-emissive panel, such as an OLED display panel or a micro-LED display panel. In some embodiments, the light source 220 may include a display panel that is illuminated by an external source, such as an LCD panel, an LCoS display panel, or a DLP display panel. Examples of an external source may include a laser, an LED, an OLED, or a combination thereof.

The light conditioning system 225 may include one or more optical components configured to condition the light emitted by the light source 220. In some embodiments, the light conditioning system 225 may be controlled by the controller 215 perform various conditioning of the light emitted by the light source 220. Conditioning the light may include, e.g., transmitting, attenuating, expanding, collimating, and/or adjusting orientation of the light.

The light source assembly 205 may generate and output an image light 230 toward an in-coupling element 235 coupled with the light guide 210. For example, the in-coupling element 235 may be disposed at a first portion of the light guide 210. The in-coupling element 235 may couple the image light 230 into a total internal reflection ("TIR") path inside the light guide 210. The light guide 210 may guide the image light 230 from the in-coupling element 235 to an out-coupling element 245 coupled with the light guide 210. For example, the out-coupling element 245 may be disposed at a second portion of the light guide 210. The image light 230 in-coupled by the in-coupling element 235 may propagate inside the light guide 210 through TIR as a TIR propagating light 231 toward the out-coupling element 245. The first portion and the second portion may be located at different locations of the light guide 210. The out-coupling element 245 may be configured to couple the TIR propagating light 231 out of the light guide 210 as an output light 232 toward the eye 260. The out-coupling element 245 may continuously couple the TIR propagating light 231 out of the light guide 210 at different positions of the out-coupling element 245 when the TIR propagating light 231 is incident onto the different positions of the out-coupling element 245. Thus, the out-coupling element 245 may replicate the image light to expand an effective pupil of the light guide display assembly 200. In some embodiments, the light guide 210 may receive a light 255 from a real-world environment, and may combine the light 255 with the output light 232 (which may be an image light), and deliver the combined light to the eye 260.

The light guide 210 may include a first surface or side 210-1 facing the real-world environment and an opposing second surface or side 210-2 facing the eye 260. Depending on the location of the light source assembly 205 and the type of the in-coupling element 235, the in-coupling element 235 may be disposed at the first surface 210-1 or the second surface 210-2, may be disposed at the same side of the light guide 210 as the light source assembly 205. In some embodiments, the in-coupling element 235 and the light source assembly 205 may be disposed at different sides of the light guide 210. In the embodiment shown in FIG. 2A, the in-coupling element 235 is disposed at the first surface 210-1 of the light guide 210. In some embodiments, the in-coupling element 235 may be integrally formed as a part of the light guide 210 at the first surface 210-1.

In some embodiments, the in-coupling element 235 may be formed or disposed at (e.g., affixed to) the first surface 210-1 of the light guide 210 as a separate element. In some embodiments, the in-coupling element 235 may be disposed at the second surface 210-2 of the light guide 210 as a separate element. In some embodiments, the in-coupling element 235 may be integrally formed as a part of the light guide 210 at the second surface 210-2. In some embodiments, the in-coupling element 235 may include one or more diffraction gratings, one or more cascaded reflectors, one or more prismatic surface elements, and/or an array of holographic reflectors, or any combination thereof. In some embodiments, the in-coupling element 235 may include one or more polarization selective elements, and may be referred to as a polarization selective in-coupling element. A polarization selective element may include a polarization selective grating or holographic element fabricated based on isotropic or anisotropic materials. The polarization selective grating or holographic element may include suitable sub-wavelength structures, liquid crystals, photo-refractive holographic materials, or any combination thereof. A pitch of the polarization selective grating included in the in-coupling element 235 may be configured to enable total internal reflection ("TIR") of the image light 230 within the light guide 210. As a result, the image light 230 coupled into the light guide 210 by the in-coupling element 235 may propagate within the light guide 210 through TIR along a TIR path 213 at a propagation angle α. As shown in FIG. 2A, the propagation angle α may be defined as an angle formed between the TIR path 213 and a normal 223 of an inner surface of the light guide 210.

The out-coupling element 245 may be disposed at the first surface 210-1 or the second surface 210-2 of the light guide 210. For example, as shown in FIG. 2A, the out-coupling element 245 may be disposed at the second surface 210-2 of the light guide 210. In some embodiments, the out-coupling element 245 may be integrally formed as a part of the light guide 210. In some embodiments, the out-coupling element 245 may be formed or dispose at (e.g., affixed to) the second surface 210-2 of the light guide 210 as a separate element. In some embodiments, the out-coupling element 245 may be disposed at the first surface 210-1 of the light guide 210. For example, in some embodiments, the out-coupling element 245 may be integrally formed as a part of the light guide 210 at the first surface 210-1. In some embodiments, the out-coupling element 245 may be formed or disposed at (e.g., affixed to) the first surface 210-1 of the light guide 210 as a separate element.

In some embodiments, the out-coupling element 245 may include one or more diffraction gratings, one or more cascaded reflectors, one or more prismatic surface elements, and/or an array of holographic reflectors, or any combination thereof. In some embodiments, the out-coupling element 245 may include one or more polarization selective elements, and may be referred to as a polarization selective out-coupling element. A polarization selective element may include a polarization selective grating or holographic element fabricated based on isotropic or anisotropic materials. The polarization selective grating or holographic element may include suitable sub-wavelength structures, liquid crystals, photo-refractive holographic materials, or any combination thereof. A pitch of the polarization selective grating included in the out-coupling element 245 may be configured such that the polarization selective grating may diffract the image light 230 out of the light guide 210. As a result, the TIR no longer occurs.

The light guide 210 may include one or more materials configured to facilitate the total internal reflection of the image light 230. The light guide 210 may include, for example, a plastic, a glass, and/or polymers. The light guide 210 may have a relatively small form factor. For example, the light guide 210 may be approximately 50 mm wide along the x-dimension, 30 mm long along the y-dimension, and 0.5-1 mm thick along the z-dimension.

The controller 215 may be communicatively coupled with the light source assembly 205, and may control the operations of the light source assembly 205. In some embodiments, the light guide display assembly 200 may be configured to direct the input image light 230 to the eye 260 as an output image light 232 with an increased or expanded field of view ("FOV"). For example, the output FOV of the image light 232 provided to the eye 260 may be equal to or greater than 60 degrees and equal to or less than 150 degrees in the x-axis direction and/or the y-axis direction. The light guide 210 may be configured to provide an eye-box with a width of equal to or greater than 8 mm and equal to or less than 50 mm, and a height of equal to or greater than 6 mm and equal to or less than 20 mm. With the light guide display assembly 200, the physical display and electronics may be moved to a side of a front body of an NED, and a substantially unobstructed view of the real world environment may be achieved, which enhances the AR user experience.

Figure 2B:
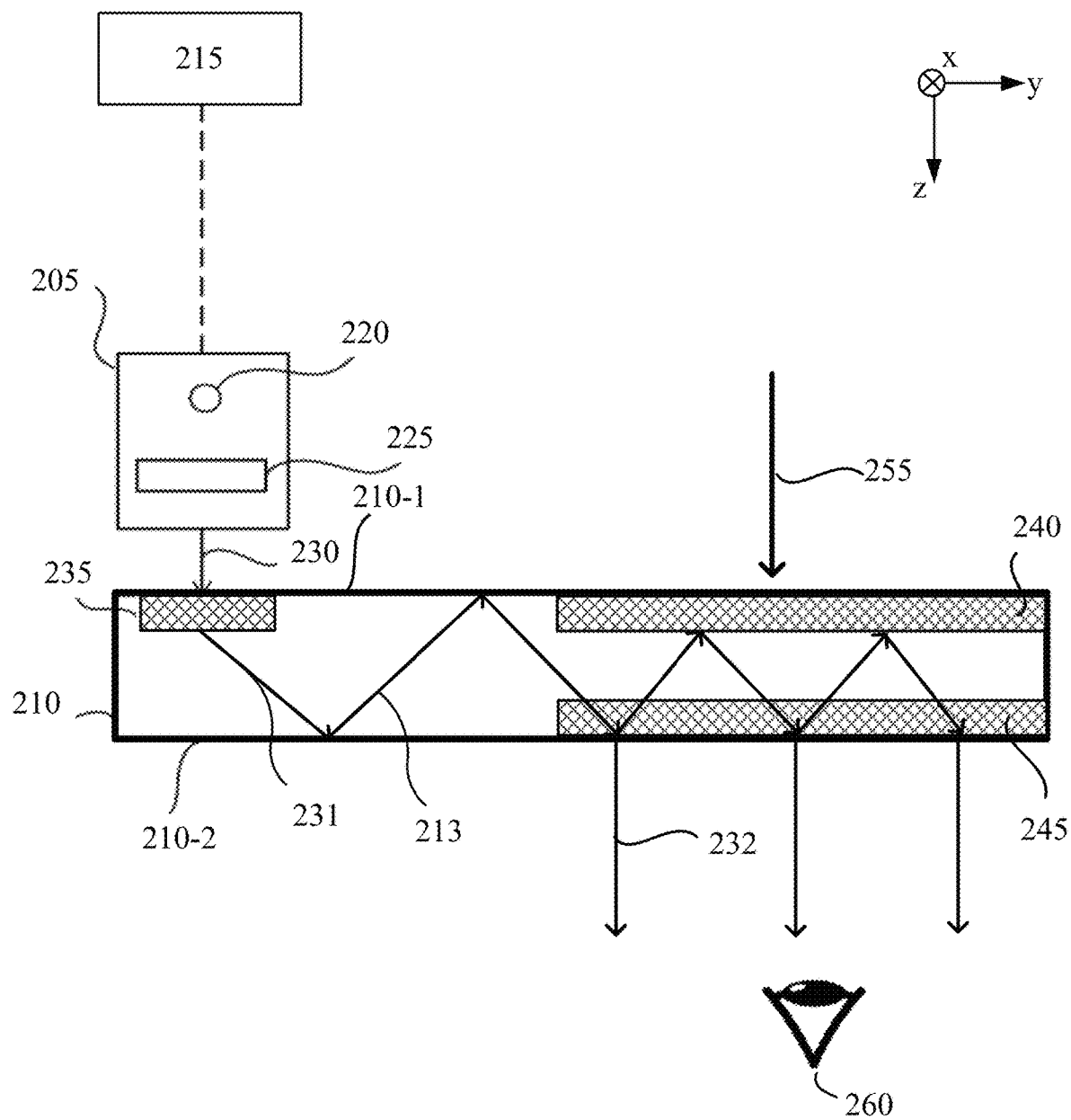
FIG. 2B illustrates a schematic diagram of a light guide display assembly, according to another embodiment of the present disclosure.

In some embodiments, the light guide 210 may include one or more additional elements configured to redirect, fold, and/or expand the image light 230 toward the out-coupling element 245. FIG. 2B illustrates a schematic diagram of an optical system or device 250 according to an embodiment of the present disclosure. The optical system 250 may be configured to provide an expanded FOV (e.g., to expand an FOV of an image light delivered by the optical system 250). The optical system 250 may also be referred to as a light guide display assembly 250. The light guide display assembly 250 may include elements similar to or the same as those included in the light guide display assembly 200 shown in FIG. 2A. Descriptions of the same or similar element can refer to the above descriptions rendered in connection with FIG. 2A.

For example, as shown in FIG. 2B, the light guide display assembly 250 may include the light guide 210, the light source assembly 205, the in-coupling element 235, the out-coupling element 245, and the controller 215. The light guide display assembly 250 may additionally include a directing element 240 configured to redirect the image light 230 toward the out-coupling element 245, such that the image light 230 may be coupled out of the light guide 210 by the out-coupling element 245. In some embodiments, the directing element 240 may be arranged at location of a surface opposing the location of the out-coupling element 245. In some embodiments, the directing element 240 may be disposed at the first surface 210-1 of the light guide 210 at a location corresponding to and opposing the location of the out-coupling element 245 at the second surface 210-2. In some embodiments, the directing element 240 may be integrally formed as a part of the light guide 210 at the first surface 210-1. In some embodiments, the directing element 240 may be formed or disposed at (e.g., affixed to) the first surface 210-1 of the light guide 210 as a separate element. In some embodiments, the directing element 240 may be disposed at the second surface 210-2 of the light guide 210 and the out-coupling element 245 may be disposed at the first surface 210-1 opposing the directing element 240. For example, in some embodiments, the directing element 240 may be integrally formed as a part of the light guide 210 at the second surface 210-2. In some embodiments, the directing element 240 may be formed or disposed at (e.g., affixed to) the second surface 210-2 of the light guide 210 as a separate element. In some embodiments, the directing element 240 and the out-coupling element 245 may be disposed at the same surface of the light guide 210. For example, the directing element 240 and the out-coupling element 245 may be stacked together.

In some embodiments, the directing element 240 and the out-coupling element 245 may have a similar structure. In some embodiments, the directing element 240 may include one or more diffraction gratings, one or more cascaded reflectors, one or more prismatic surface elements, and/or an array of holographic reflectors, or any combination thereof. In some embodiments, the directing element 240 may include one or more polarization selective elements, and may be referred to as a polarization selective directing element. A polarization selective element may include a polarization selective grating or holographic element fabricated based on isotropic or anisotropic materials. The polarization selective grating or holographic element may include suitable sub-wavelength structures, liquid crystals, photo-refractive holographic materials, or any combination thereof. The directing element 240 may also be referred to as a folding element 240. In some embodiments, multiple functions, e.g., redirecting, folding, and/or expanding the image light 230 generated by the light source assembly 205 may be combined into a single element, e.g. the out-coupling element 245. In such embodiments, the directing element 240 may be omitted.

FIGS. 3A-7B illustrate schematic diagrams of light guide display assemblies configured to provide an expanded FOV, according to various embodiments of the present disclosure. For illustrative and discussion purposes, each of polarization selective in-coupling elements, polarization selective out-coupling elements, and/or polarization selective directing elements shown in the figures may include one or more polarization selective gratings, e.g., transmissive type or reflective type polarization selective gratings. A polarization selective grating included in a polarization selective in-coupling element may be referred to as a polarization selective in-coupling grating. A polarization selective grating included in a polarization selective out-coupling element may be referred to as a polarization selective out-coupling grating. For illustrative and discussion purposes, all of the polarization selective in-coupling gratings and all of the polarization selective out-coupling gratings shown in the figures may be of the same type (e.g., transmissive or reflective). In some embodiments, the polarization selective in-coupling gratings may be of different types. In some embodiments, the polarization selective out-coupling gratings may be of different types. In some embodiments, the polarization selective in-coupling gratings and the polarization selective out-coupling gratings may be of different types.

In some embodiments, the polarization selective element may include an optically anisotropic material (e.g., an LC material). An optic axis of the optically anisotropic material may be configured with a spatially varying orientation in both an in-plane direction and an out-of-plane direction to provide a polarization sensitive holographic response. In some embodiments, the optically anisotropic material including an optical axis configured with such a spatially varying orientation may form a polarization volume hologram ("PVH") or a PVH element. The term "optic axis" may refer to a direction in a crystal. A light propagating in the optic axis direction may not experience birefringence (or double refraction). An optic axis may be a direction rather than a single line: lights that are parallel to that direction may experience no birefringence. In some embodiments, the PVH may be configured to primarily (or substantially) diffract a circularly polarized light (or an elliptically polarized light) having a predetermined handedness, and primarily (or substantially) transmit (e.g., with negligible diffraction) a circularly polarized light (or an elliptically polarized light) having a handedness that is opposite to the predetermined handedness. It is understood that the PVH may transmit the circularly polarized light (or the elliptically polarized light) having the predetermined handedness, with a much smaller light transmittance than the circularly polarized light (or the elliptically polarized light) having the handedness that is opposite to the predetermined handedness. The PVH may diffract the circularly polarized light (or the elliptically polarized light) having the handedness that is opposite to the predetermined handedness, with a much smaller diffraction efficiency than the circularly polarized light (or the elliptically polarized light) having the predetermined handedness.

An unpolarized light or a linearly polarized light may be decomposed into two circularly polarized components (e.g., a first component and a second component) with opposite handednesses. Thus, the first component may be primarily diffracted by the PVH, and the second component may be primarily transmitted (e.g., with negligible diffraction) by the PVH. The PVH may be configured to primarily (or substantially) forwardly or backwardly diffract the circularly polarized light (or the elliptically polarized light) having the predetermined handedness. When the PVH is configured to primarily (or substantially) forwardly diffract the circularly polarized light (or the elliptically polarized light) having the predetermined handedness, the PVH may be referred to as a transmissive PVH. When the PVH is configured to primarily (or substantially) backwardly diffract the circularly polarized light (or the elliptically polarized light) having the predetermined handedness, the PVH may be referred to as a reflective PVH.

In some embodiments, the PVH may include optically anisotropic molecules (e.g., LC molecules) arranged in a plurality of helix structures in a volume of the PVH. The handedness of the helical structures may define the polarization selectivity of the PVH. In some embodiments, the PVH may be configured to primarily (or substantially) diffract a circularly polarized light (or an elliptically polarized light) having a handedness that is the same as the handedness of the helical structures, and primarily (or substantially) transmit (e.g., with negligible diffraction) a circularly polarized light (or an elliptically polarized light) having a handedness that is opposite to the handedness of the helical structures. In some embodiments, the optically anisotropic molecules in the PVH may not be arranged in a plurality of helix structures in a volume of the PVH. The handedness of the rotation of the directors of the optically anisotropic molecules at an optically anisotropic molecule director plane may define the polarization selectivity of the PVH. An optically anisotropic molecule director plane (or a molecule director plane) is a plane formed by or including directors of the optically anisotropic molecules. The optically anisotropic molecules may be arranged in a plurality of parallel molecule director planes within the volume of the PVH. In some embodiments, the PVH may be configured to primarily (or substantially) diffract a circularly polarized light (or an elliptically polarized light) having a handedness that is the same as the handedness of the rotation of the directors of the optically anisotropic molecules at the molecule director planes, and primarily (or substantially) transmit (e.g., with negligible diffraction) a circularly polarized light (or an elliptically polarized light) having a handedness that is opposite to the handedness of the rotation of the directors of the optically anisotropic molecules at the molecule director planes.

In some embodiments, depending on the handedness of the helical structures within the volume of the PVH, or the handedness of the rotation of the directors of the optically anisotropic molecules at the molecule director planes within the volume of the PVH, the PVH may be referred to as a left-handed PVH or a right-handed PVH. For example, a left-handed PVH may be configured to primarily (forwardly or backwardly) diffract a left-handed circularly polarized ("LHCP") light, and primarily transmit (e.g., with negligible diffraction) a right-handed circularly polarized ("RHCP") light. A right-handed PVH may be configured to primarily (forwardly or backwardly) diffract an RHCP light and primarily transmit (e.g., with negligible diffraction) an LHCP light.

In the following descriptions, for illustrative purposes, polarization selective gratings including PVH (also referred to as PVH gratings) may be used as examples of the polarization selective in-coupling element, the polarization selective out-coupling element, and/or the polarization selective directing/folding element. In some embodiments, the light guide display assembly may also include other suitable polarization selective elements to provide an expanded FOV, following the same or similar design principles described herein with respect to the embodiments having light guide(s) coupled with one or more PVH gratings. In addition, for illustrative purposes, one-dimensional ("1D") FOV expansion (e.g., horizontal FOV expansion) is used an example to explain the principle of expanding the FOV. In some embodiments, two-dimensional ("2D") FOV expansion (e.g., horizontal and vertical FOV expansions) may also be achieved by introducing one or more additional polarization selective elements (e.g., a polarization selective folding element or directing element) configured to redirect the light by 90° toward the polarization selective out-coupling element. Although polarization selective gratings may be used as examples of the polarization selective elements included in the polarization selective in-coupling element, the out-coupling element, and/or the directing element, the polarization selective elements included in the in-coupling element, the out-coupling element, and/or the directing element are not limited to polarization selective gratings.

Figure 3:
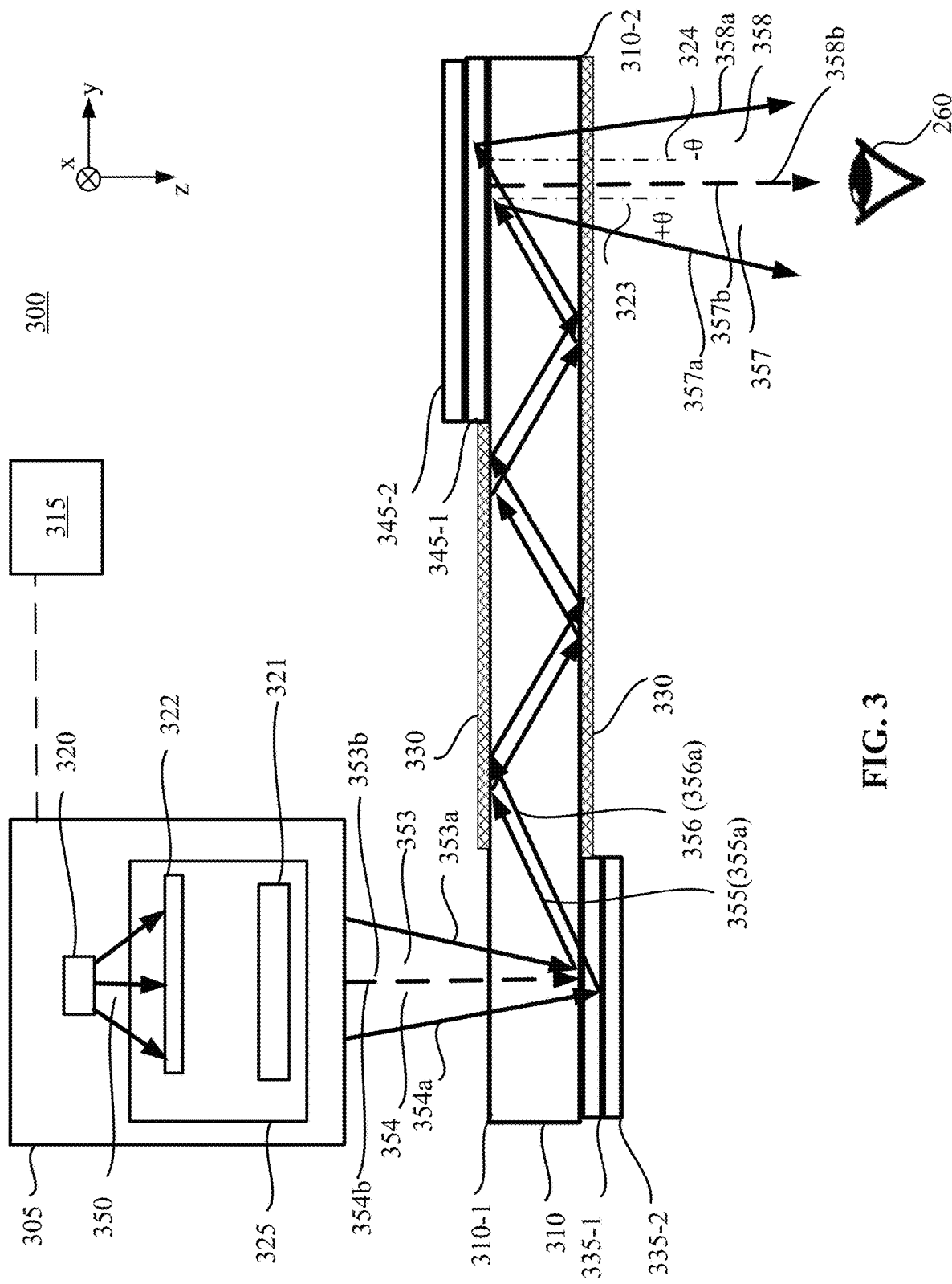
FIG. 3 illustrates a schematic diagram of a light guide display assembly configured to provide an expanded field of view ("FOV"), according to an embodiment of the present disclosure.

FIG. 3 illustrates a schematic diagram of an optical system or device 300 according to an embodiment of the present disclosure. The optical device 300 may also be referred to as a light guide display assembly 300. The light guide display assembly 300 may be configured to provide an expanded FOV. The light guide display assembly 300 may include elements, structures, and/or functions that are the same as or similar to those included in the light guide display assembly 200 shown in FIG. 2A or the light guide display assembly 250 shown in FIG. 2B. Descriptions of the same or similar elements, structures, and/or functions can refer to the descriptions rendered above in connection with FIG. 2A or 2B.

As shown in FIG. 3, the light guide display assembly 300 may include a light source assembly 305, a light guide 310, and a controller 315, which may include elements, structures, and/or functions similar to or the same as those of the light source assembly 205, the light guide 210, and the controller 215 shown in FIGS. 2A and 2B, respectively. The light source assembly 305 may include a light source 320 configured to generate an image light 350 (representing a virtual image or a display image) with a predetermined FOV (e.g., equal to or larger than 40°). The light source assembly 305 may output the image light 350 with the predetermined FOV in multiple portions (e.g., a first portion and a second portion) with orthogonal polarizations, with each portion corresponding to a portion of the FOV. For example, the light source assembly 305 may output a first light 353 (or a first input light 353) corresponding to a first portion of the FOV (referring to as a first input FOV) and a second light 354 (or a second input light 354) corresponding to a second portion of the FOV (referring to as a second input FOV). The first light 353 with the first input FOV and the second light 354 with the second input FOV may propagate from the light source assembly 305 toward the light guide 310 in different, non-parallel directions, as shown in FIG. 3. The first light 353 and the second light 354 may have orthogonal polarizations. In the y-z sectional view shown in FIG. 3, the first light 353 with the first input FOV may be bounded by first rays 353a and 353b. For example, the first ray 353a may be the rightmost ray of the first light 353, and the first ray 353b may be the leftmost ray of the first light 353. The second light 354 with the second input FOV may be bounded by second rays 354a and 354b. For example, the second ray 354a may be the leftmost ray of the second light 354, and the second ray 354b may be the rightmost ray of the second light 354. In some embodiments, the second ray 354b (e.g., the rightmost ray of the second light 354) and the first ray 353b (e.g., the leftmost ray of the first light 353) may substantially overlap with each other. The second ray 354b and the first ray 353b are denoted by a same dashed line in the y-z sectional view shown in FIG. 3. The controller 315 may control various elements included in the light guide display assembly 300, such as the light source assembly 305.

The light guide 310 may be configured to receive the first light 353 and the second light 354 propagating from the light source assembly 305 in different directions. The light guide 310 may be coupled with one or more in-coupling elements. In some embodiments, each in-coupling element may be polarization selective. In some embodiments, each in-coupling element may include one or more polarization selective gratings. For discussion purposes, each in-coupling element may be referred to as an in-coupling grating. It is understood that in other embodiments, a non-grating structure may be used as the in-coupling element. In the embodiment shown in FIG. 3, the light guide 310 may be coupled with a first in-coupling grating 335-1 and a second in-coupling grating 335-2, which may be configured to couple, via diffraction, the first light 353 and the second light 354 with orthogonal polarizations into the light guide 310, respectively. Each of the in-coupling gratings 335-1 and 335-2 may be a transmissive type grating or a reflective type grating. The first in-coupling grating 335-1 may couple, via diffraction, the first light 353 into the light guide 310 as a first TIR propagating light 355, and the second in-coupling grating 335-2 may couple, via diffraction, the second light 354 into the light guide 310 as a second TIR propagating light 356. For illustrative purposes, FIG. 3 shows one first TIR propagating ray 355a of the first TIR propagating light 355, and one second TIR propagating ray 356a of the second TIR propagating light 356. The first in-coupling grating 335-1 may couple the first ray 353a into the light guide 310 as the first TIR propagating ray 355a. The second in-coupling grating 335-2 may couple the second ray 354a into the light guide 310 as the second TIR propagating ray 356a. The corresponding TIR propagating rays of the first ray 353b and the second ray 354b are not drawn in FIG. 3.

The light guide 310 may also be coupled with one or more out-coupling elements. In some embodiments, each out-coupling element may be polarization selective. In some embodiments, each out-coupling element may include one or more polarization selective gratings. For discussion purposes, each out-coupling element may be referred to as an out-coupling grating. It is understood that in other embodiments, a non-grating structure may be used as the out-coupling element. In the embodiment shown in FIG. 3, the light guide 310 may be coupled with a first out-coupling grating 345-1 and a second out-coupling grating 345-2. Each of the out-coupling gratings 345-1 and 345-2 may be a transmissive type grating or a reflective type grating. The first out-coupling grating 345-1 and the second out-coupling grating 345-2 may be configured to couple, via diffraction, the first TIR propagating light 355 and the second TIR propagating light 356 out of the light guide 310 in different, non-parallel directions, respectively. The first out-coupling grating 345-1 may be configured to couple the first TIR propagating light 355 out of the light guide 310 as a first output light 357 bounded by first output rays 357a and 357b. The second out-coupling grating 345-2 may be configured to couple the second TIR propagating light 356 out of the light guide 310 as a second output light 358 bounded by second output rays 358a and 358b.

In some embodiments, the first output light 357 may correspond to a first output FOV, and the second output light 358 may correspond to a second output FOV. The first output FOV may correspond to an angular region bounded by the first output rays 357a and 357b. The second output FOV may correspond to an angular region bounded by the second output rays 358a and 358b. That is, the first in-coupling grating 335-1, the light guide 310, and the first out-coupling grating 345-1 may be configured to provide the first output FOV at an eye-box of the light guide display assembly 300. The second in-coupling grating 335-2, the light guide 310, and the second out-coupling grating 345-2 may be configured to provide the second output FOV at the eye-box of the light guide display assembly 300. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV and the second output FOV may larger than the first input FOV and the second input FOV of the first input light 353 and the second input light 354, or may be larger than the predetermined FOV of the image light 350.

In some embodiments, the first TIR propagating light 355 may correspond to a first intermediate FOV that is smaller than the first input FOV of the first input light 353, and the second TIR propagating light 356 may correspond to a second intermediate FOV that is smaller than the second input FOV of the second input light 354. A combination of the first output FOV and the second output FOV of the lights 357 and 358 at the output side of the light guide display assembly 300 may be larger than a combination of the first intermediate FOV and the second intermediate FOV.

In some embodiments, the first out-coupling grating 345-1 may be configured to couple the first TIR propagating ray 355a out of the light guide 310 as a first output ray 357a at a first output angle. The second out-coupling grating 345-2 may be configured to couple the second TIR propagating ray 356a out of the light guide 310 as a second output ray 358a at a second output angle. In some embodiments, the first output angle and the second output angle may have a same absolute value and opposite signs, e.g., opposite output angles +θ and −θ. In some embodiments, the first output angle and the second output angle may have different absolute values and opposite signs (e.g., +θ1 and −θ2, with θ1 and θ2 having different values). In some embodiments, the first in-coupling grating 335-1 may be configured to couple the first ray 353b into the light guide 310 and the first out-coupling grating 345-1 may be configured to couple the first ray 353b out of the light guide 310 as a first output ray 357b. In some embodiments, the second in-coupling grating 335-1 may be configured to couple the second ray 354b into the light guide 310 and the second out-coupling grating 345-1 may be configured to couple the second ray 354b out of the light guide 310 as a second output ray 358b. In some embodiments, the first output ray 357b and the second output ray 358b may substantially overlap with each other.

It is noted that when the ray is diffracted out of the light guide, the output angle of the output ray is also referred to as a diffraction angle. A diffraction angle refers to an angle formed by a diffracted ray and a normal of a surface of the out-coupling grating (in some embodiments, the normal of the surface of the out-coupling grating may be parallel with a normal of a surface of the light guide to which the out-coupling grating is coupled). In the present disclosure, a diffraction angle can be defined as a positive angle or a negative angle, depending on the positional relationship between the diffracted ray and the normal of the surface of the out-coupling grating. For example, when the diffracted ray is in a direction clockwise from the normal, the diffraction angle may be defined as a positive angle, and when the diffracted ray is in a direction counter-clockwise from the normal, the diffraction angle may be defined as a negative angle, as shown in FIG. 3.

In a conventional light guide display assembly, a propagation angle of a TIR path inside the light guide may correspond, one-to-one, to an output angle of an output ray out-coupled from the light guide, regardless of the polarization state of the TIR propagating rays. That is, a propagation angle of the TIR path may correspond to a single output angle of a ray out-coupled from the light guide, regardless of the polarization state of the TIR propagating rays. The propagation angle is determined by the refractive index of the light guide. Thus, the FOV provided by the light guide (or the light guide display assembly) may be determined by the refractive index of the light guide. In the light guide display assembly 300 shown in FIG. 3, with the polarization selective in-coupling gratings 335-1, 335-2, and out-coupling gratings 345-1, 345-2, a same propagation angle of a TIR path inside the light guide 310 may correspond to two different output angles, e.g., two diffraction angles with opposite signs. For example, the first TIR propagating ray 355a and the second TIR propagating ray 356a having substantially the same propagation angle of the TIR path may be diffracted by the out-coupling gratings 345-1 and 345-2 as the first output ray 357a and the second output ray 358a, respectively, where the first output ray 357a and the second output ray 358a have output angles (e.g., diffraction angles) with opposite signs. Thus, the FOV provided by the light guide display assembly 300 may be enlarged or expanded (e.g., doubled) compared to a conventional light guide display assembly when the light guides included in the assemblies are fabricated with a material having a same or similar refractive index. Alternatively or additionally, compared to a conventional light guide display assembly, a same or similar FOV may be provided by the disclosed light guide display assembly 300 using a light guide fabricated with a material having a lower refractive index.

In some embodiments, each of the in-coupling gratings 335-1 and 335-2 may be disposed at a first surface 310-1 or a second surface 310-2 of the light guide 310. For example, in some embodiments, the in-coupling gratings 335-1 and 335-2 may be disposed at the first surface 310-1 or the second surface 310-2 of the light guide 310 side by side or in a stacked configuration. Each of the out-coupling gratings 345-1 and 345-2 may be disposed at the first surface 310-1 or the second surface 310-2 of the light guide 310. For example, in some embodiments, the out-coupling gratings 345-1 and 345-2 may be disposed at the first surface 310-1 or the second surface 310-2 of the light guide 310 side by side or in a stacked configuration. For illustrative purposes, FIG. 3 shows that the in-coupling gratings 335-1 and 335-2 are stacked at the second surface 310-2 of the light guide 310, and the out-coupling gratings 345-1 and 345-2 are stacked at the first surface 310-1 of the light guide 310. In some embodiments, the in-coupling gratings 335-1 and 335-2 may be disposed at the first surface 310-1 and the out-coupling gratings 345-1 and 345-2 may be disposed at the second surface 310-2. In some embodiments, the in-coupling gratings 335-1 and 335-2 and the out-coupling gratings 345-1 and 345-2 may be disposed at the same surface (e.g., the first surface 310-1 or the second surface 310-2). At least one (e.g., each) of the grating 335-1, 335-2, 345-1, or 345-2 may be a polarization selective grating configured to primarily (e.g., substantially) diffract a polarized light having a predetermined polarization and primarily (e.g., substantially) transmit, with substantially zero or negligible diffraction, a polarized light having a polarization different from the predetermined polarization (e.g., an orthogonal polarization). The predetermined polarizations associated with the gratings 335-1, 335-2, 345-1, and 345-2 may or may not be the same.

In some embodiments, the in-coupling gratings 335-1 and 335-2 may be configured to diffract polarized lights having orthogonal polarizations. For example, the first in-coupling grating 335-1 may be configured to primarily diffract a polarized light having a first polarization and primarily transmit, with substantially zero or negligible diffraction, a polarized light having a second polarization orthogonal to the first polarization. The second in-coupling grating 335-2 may be configured to primarily diffract a polarized light having the second polarization and primarily transmit, with substantially zero or negligible diffraction, a polarized light having the first polarization orthogonal to the second polarization. In some embodiments, the out-coupling gratings 345-1 and 345-2 may be configured to diffract polarized lights with orthogonal polarizations, e.g., orthogonally polarized lights. Each of the out-coupling gratings 345-1 and 345-2 may have the same polarization selectivity as a corresponding one of the in-coupling gratings 335-1 and 335-2. For example, the first out-coupling grating 345-1 may have the same polarization selectivity as the first in-coupling grating 335-1, and the second out-coupling grating 345-2 may have the same polarization selectivity as the second in-coupling grating 335-2. The out-coupling grating 345-1 may be configured to primarily diffract a polarized light having the first polarization and primarily transmit, with substantially zero or negligible diffraction, a polarized light having the second polarization orthogonal to the first polarization. The out-coupling grating 345-2 may be configured to primarily diffract a polarized light having the second polarization and primarily transmit, with substantially zero or negligible diffraction, a polarized light having the first polarization orthogonal to the second polarization. In some embodiments, the first out-coupling grating 345-1 may have the same polarization selectivity as the second in-coupling grating 335-2, and the second out-coupling grating 345-2 may have the same polarization selectivity as the first in-coupling grating 335-1.

In some embodiments, at least one (e.g., each) of the grating 335-1, 335-2, 345-1, or 345-2 may be a polarization selective grating, which may be configured to primarily diffract a polarized light having a predetermined polarization and primarily transmit, with substantially zero or negligible diffraction, a polarized light having a different (e.g., orthogonal) polarization. For example, at least one (e.g., each) of the grating 335-1, 335-2, 345-1, or 345-2 may be a circular polarization selective grating, which may be configured to primarily diffract a circularly polarized light having a predetermined handedness and primarily transmit, with substantially zero or negligible diffraction, a circularly polarized light having a handedness opposite to the predetermined handedness. The in-coupling gratings 335-1 and 335-2 may be configured to diffract circularly polarized lights with opposite handednesses. For example, the first in-coupling grating 335-1 may be configured to diffract a circularly polarized light having a first predetermined handedness (e.g., left handedness or right handedness), and the second in-coupling grating 335-2 may be configured to diffract a circularly polarized light having a second predetermined handedness (e.g., right handedness or left handedness) opposite to the first predetermined handedness. The out-coupling gratings 345-1 and 345-2 may be also configured to diffract circularly polarized lights with opposite handednesses. For example, the first out-coupling grating 345-1 may be configured to diffract a light having the first predetermined handedness, and the second out-coupling grating 345-2 may be configured to diffract a light having the second predetermined handedness opposite to the first predetermined handedness. In some embodiments, each of the in-coupling gratings 335-1 and 335-2 may include a transmissive PVH or a reflective PVH. In some embodiments, each of the out-coupling gratings 345-1 and 345-2 may include a transmissive PVH or a reflective PVH. Various combinations of transmissive PVHs and/or reflective PVHs may be included in or implemented as the in-coupling gratings 335-1 and 335-2, and the out-coupling gratings 345-1 and 345-2.

The light source assembly 305 may include a light source (e.g., an electronic display) 320 and a light conditioning system 325. The light source assembly 305 may include other elements not shown in FIG. 3. The light source 320 may be an embodiment of (or may be similar to) the light source 220 shown in FIGS. 2A and 2B, and the light conditioning system 325 may be an embodiment of (or may be similar to) the light conditioning system 225 shown in FIGS. 2A and 2B. In some embodiments, the image light 350 may be unpolarized or polarized. In some embodiments, the image light 350 may be a diverging light. The light conditioning system 325 may be configured to receive the image light 350 from the light source 320, and process the image light 350 to output the first light 353 and the second light 354 configured with the desirable properties. The light conditioning system 325 may include suitable optical elements configured to process the image light 350. The optical paths of the light 350 propagating in the light conditioning system 325 are not shown in FIG. 3. The light 350 may propagate in the light conditioning system 325 in any suitable optical paths.

In some embodiments, the light conditioning system 325 may include a directing element (not drawn) configured to direct different portions of the image light 350 corresponding to different portions of the FOV in different propagating directions. For example, the directing element may be configured to direct a first portion of the light 350 into a first propagating direction, and a second portion of the image light 350 into a second propagating direction different from the first propagating direction. In some embodiments, the light conditioning system 325 may include a polarization conversion element 322 configured to polarize the image light 350 and output two orthogonally polarized lights. In some embodiments, the polarization conversion element 322 may include one or more linear polarizer, one or more circular polarizers, one or more switchable waveplates, such as one or more switchable half-wave plates, one or more switchable quarter-wave plates, or a combination thereof. In some embodiments, the controller 315 may control an operating state (e.g., a switching state or a non-switching state) of the polarization conversion element 322. In some embodiments, the light conditioning system 325 may also include a collimator 321 (e.g., a collimating lens) configured to collimate the image light 350. The directing element may be disposed at a suitable position in the light conditioning system 325. In some embodiments, the directing element may be disposed between the polarization conversion element 322 and the light source 320. In some embodiments, the directing element may be disposed between the polarization conversion element 322 and the collimator 321. In some embodiments, the directing element may be disposed between the collimator 321 and the light guide 310. In some embodiments, the directing element may be omitted.

In some embodiments, the light source assembly 305 may output the first light 353 and the second light 354 together during a same time period (i.e., simultaneously), e.g., during a same display frame of the display image (or a same sub-frame of a display frame) generated by the light source 320. In some embodiments, the light source assembly 305 may output the first light 353 and the second light 354 in a time-sequential manner. For example, a display frame of the display image generated by the light source 320 may include two consecutive sub-frames. The controller 315 may control the light source assembly 305 to output the first light 353 with the first input FOV corresponding to the first portion of the predetermined FOV of the image light 350 in a first sub-frame, and the second light 354 with the second input FOV corresponding to the second portion of the predetermined FOV of the image light 350 in a second sub-frame. The first sub-frame and the second sub-frame may be two consecutive sub-frames of a display frame. In some embodiments, the light source 320 may be coupled to an optical switch, which may be configured to transmit the first light 351 and block the second light 352 in the first sub-frame, and transmit the second light 352 and block the first light 351 in the second sub-frame. In some embodiments, the optical switch may be controlled by the controller 315.

In the embodiment shown in FIG. 3, reflective PVH gratings are used as examples of the in-coupling gratings 335-1 and 335-2 and out-coupling gratings 345-1 and 345-2. The in-coupling gratings 335-1 and 335-2 may be configured to primarily backwardly diffract circularly polarized lights having opposite handednesses. The out-coupling gratings 345-1 and 345-2 may be configured to primarily backwardly diffract circularly polarized lights having opposite handednesses. For discussion purposes, the out-coupling gratings 345-1 and 345-2 may have the same polarization selectivity as the in-coupling gratings 335-1 and 335-2, respectively. For example, the first light 353 propagating toward the in-coupling grating 335-1 may be an RHCP light, and the second light 354 propagating toward the in-coupling grating 335-2 may be an LHCP light. Each of the in-coupling grating 335-1 and the out-coupling gratings 345-1 may be configured to primarily backwardly diffract an RHCP light as an RHCP light, and primarily transmit, with substantially zero or negligible diffraction, an LHCP light as an LHCP light. Each of the in-coupling grating 335-2 and the out-coupling grating 345-2 may be configured to primarily backwardly diffract an LHCP light as an LHCP light, and primarily transmit, with substantially zero or negligible diffraction, an RHCP light as an RHCP light.

Referring to FIG. 3, the in-coupling grating 335-1 may couple, via diffraction, the first light 353 (e.g., an RHCP light) into the light guide 310 as the TIR propagating light 355 (e.g., an RHCP light), and transmit, with substantially zero or negligible diffraction, the second light 354 (e.g., an LHCP light) toward the in-coupling grating 335-2. The in-coupling grating 335-2 may couple, via diffraction, the second light 354 (e.g., an LHCP light) into the light guide 310 as the TIR propagating light 356 (e.g., an LHCP light). For the simplicity of illustration, FIG. 3 merely shows the optical paths of one ray 355a in the TIR propagating light 355 (e.g., an RHCP light) and one ray 356a in the TIR propagating light 356 (e.g., an LHCP light). The TIR propagating light 355 (e.g., an RHCP light) and the TIR propagating light 356 (e.g., an LHCP light) may propagate inside the light guide 310 via TIR toward the out-coupling gratings 345-1 and 345-2.

In some embodiments, the polarizations of the TIR propagating light 355 (e.g., an RHCP light) and the TIR propagating light 356 (e.g., an LHCP light) may not be changed when propagating inside the light guide 310. In some embodiments, the polarizations of at least one of the TIR propagating light 355 (e.g., an RHCP light) or the TIR propagating light 356 (e.g., an LHCP light) may be changed when propagating inside the light guide 310, e.g., may change after being totally internally reflected at an inner surface of the light guide 310 and may become depolarized. In some embodiments, the light guide 310 may include one or more polarization correction films 330 disposed adjacent or at one or more surfaces (e.g., one or two outer surfaces) of the light guide 310. In some embodiments, the polarization correction film 330 may be configured to preserve the polarization states of the TIR propagating light 355 and/or the TIR propagating light 356 while the TIR propagating light 355 and/or the TIR propagating light 356 propagate inside the light guide 310. For example, the polarization correction film 330 may be configured to compensate for the depolarization of at least one of the TIR propagating light 355 or 356 when the TIR propagating lights 355 and 356 propagate inside the light guide 310, thereby maintaining the polarization of the at least one of the TIR propagating light 355 or 356. In the embodiment shown in FIG. 3, the polarization correction film 330 may be configured to maintain the right-handed circular polarization of the TIR propagating light 355 and the left-handed circular polarization of the TIR propagating light 356 when the TIR propagating lights 355 and 356 propagate inside the light guide 310.

The out-coupling gratings 345-1 and 345-2 may be configured to primarily backwardly diffract the TIR propagating lights 355 and 356 out of the light guide 310 in different directions, thereby replicating and expanding the FOV of the image light 350. The out-coupling grating 345-1 may be configured to couple, via diffraction, the TIR propagating light 355 (e.g., an RHCP light) out of the light guide 310 as the first output light 357 (e.g., an RHCP light) having a first diffraction angle, and transmit, with substantially zero or negligible diffraction, the TIR propagating light 356 (e.g., an LHCP light) toward the out-coupling grating 345-2. The out-coupling grating 345-2 may be configured to couple, via diffraction, the TIR propagating light 356 (e.g., an LHCP light) out of the light guide 310 as the second output light 358 (e.g., an LHCP light) having a second diffraction angle different from the first diffraction angle. In some embodiments, the first output light 357 may correspond to the first output FOV, and the second output light 358 may correspond to the second output FOV. In some embodiments, the in-coupling grating 335-1, the light guide 310, and the out-coupling grating 345-1 may be configured to provide the first output FOV at the eye-box of the light guide display assembly 300. The in-coupling grating 335-2, the light guide 310, and the out-coupling grating 345-2 may be configured to provide the second output FOV at the eye-box of the light guide display assembly 300. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV at the output side of the light guide 310 may be substantially larger than each of the first output FOV and the second output FOV. The combination of the first output FOV and the second output FOV at the output side of the light guide 310 may be larger than the predetermined FOV of the image light 350 emitted by the light source 320, or larger than the combination of the first input FOV of the first input light 353 and the second input FOV of the second input light 354 at the input side of the light guide 310.

In some embodiments, when the controller 315 controls the light source assembly 305 to output the first light 353 with the first input FOV and the second light 354 with the second input FOV during the same sub-frame (e.g., simultaneously), the out-coupling elements 345-1 and 345-2 may couple the first light 353 (i.e., 355 when in the light guide 310) and the second light 354 (i.e., 356 when in the light guide 310) out of the light guide 310 as the first output light 357 and the second output light 358 during the same sub-frame. When the controller 315 controls the light source assembly 305 to output the first light 353 with the first input FOV and the second light 354 with the second input FOV during consecutive sub-frames (e.g., a first sub-frame and a second sub-frame), the out-coupling elements 345-1 and 345-2 may couple the first light 353 (i.e., 355 when in the light guide 310) and the second light 354 (i.e., 356 when in the light guide 310) out of the light guide 310 as the first output light 357 and the second output light 358 during the consecutive sub-frames.

Figure 4:
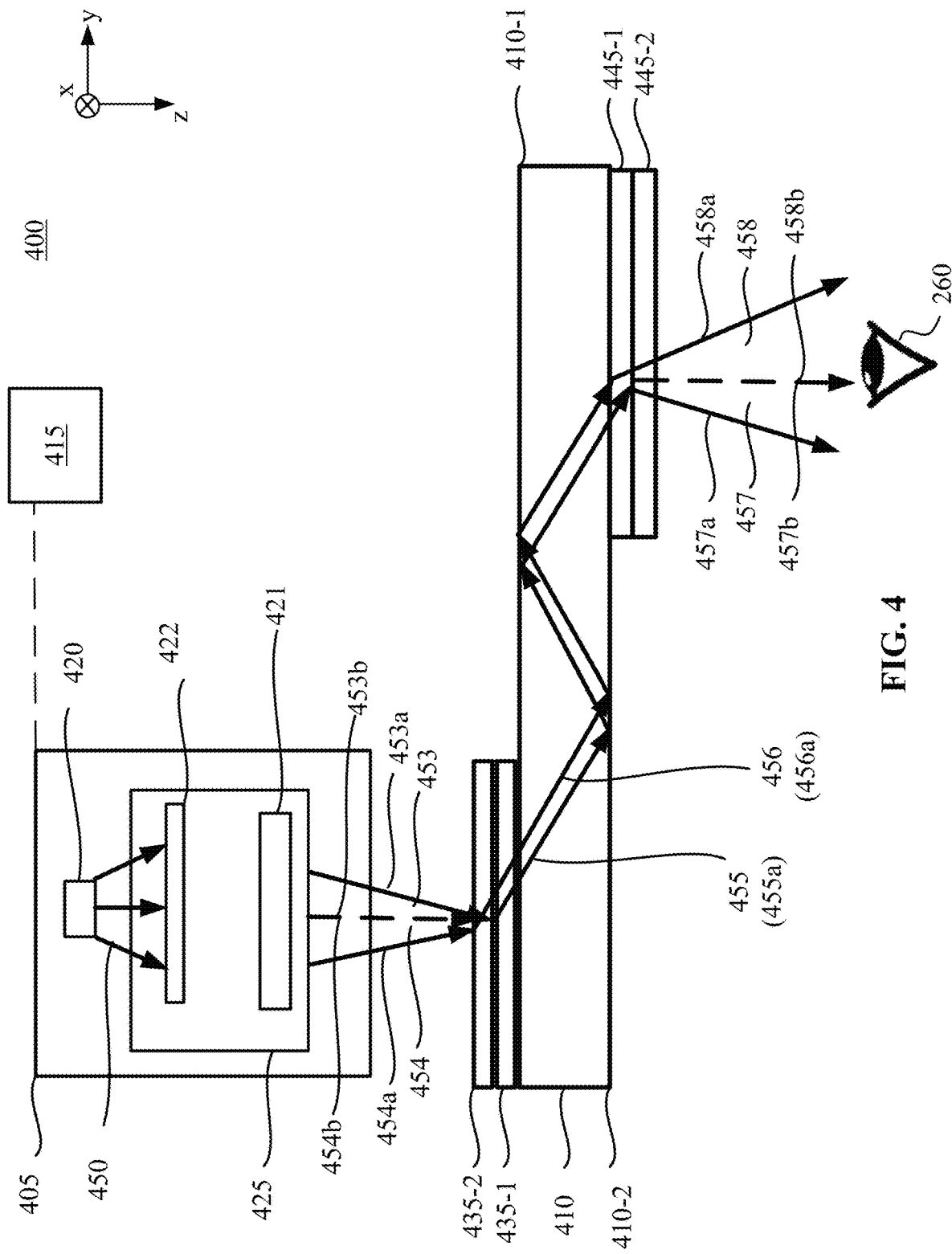
FIG. 4 illustrates a schematic diagram of a light guide display assembly configured to provide an expanded FOV, according to another embodiment of the present disclosure.

In some embodiments, the in-coupling gratings and out-coupling gratings may be transmissive PVH gratings. FIG. 4 illustrates a schematic diagram of an optical device or system 400 configured to provide an expanded FOV, according to another embodiment of the present disclosure. The optical system 400 may also be referred to as a light guide display assembly 400. The light guide display assembly 400 shown in FIG. 4 may include elements, structures, and/or functions that are the same as or similar to those included in the light guide display assembly 200 shown in FIG. 2A, the light guide display assembly 250 shown in FIG. 2B, or the light guide display assembly 300 shown in FIG. 3. Descriptions of the same or similar elements, structures, or functions can refer to the above descriptions rendered in connection with FIG. 2A, FIG. 2B, or FIG. 3.

As shown in FIG. 4, the light guide display assembly 400 may include a light source assembly 405, a light guide 410, and a controller 415, which may include elements, structures, and/or functions that are the same as or similar to those of the light source assembly 305, the light guide 310, and the controller 315 shown in FIG. 3, respectively. In some embodiments, the light source assembly 405, the light guide 410, and the controller 415 may include elements, structures, and/or functions that are the same as or similar to those of the light source assembly 205, the light guide 210, and the controller 215 shown in FIGS. 2A and 2B, respectively.

The light source assembly 405 may include a light source 420 and a light conditioning system 425 including a polarization conversion element 422 and a collimator 421, which may be similar to the light source 320 and the light conditioning system 325 including the polarization conversion element 322 and the collimator 321 shown in FIG. 3, or the light source 220 and the light conditioning system 225 shown in FIGS. 2A and 2B. Descriptions of the same or similar elements, structures, and/or functions may refer to the above descriptions rendered in connection with FIG. 2A, 2B, or 3. The controller 415 may control various elements included in the light guide display assembly 400, such as the light source assembly 405.

In some embodiments, the light source 420 may generate an image light 450 (representing a virtual image or a display image) corresponding to a display image. The image light 450 may be associated with a predetermined FOV. The image light 450 may be unpolarized or polarized. In some embodiments, the image light 450 may be a diverging light. The light conditioning system 425 may be configured to receive the image light 450 from the light source 420, and process the image light 450 to output a first light 453 (or a first input light 453) and a second light 454 (or a second input light 454) configured with desirable properties. For example, the first light 453 may correspond to a first portion (of the FOV of the image light 450 (referred to as a first input FOV), and the second light 454 may correspond to a second portion of the FOV of the image light 450 (referred to as a second input FOV). The first light 453 and the second light 454 may have orthogonal polarizations. The optical paths of the image light 450 propagating in the light conditioning system 425 are not shown in FIG. 4. The image light 450 may propagate in the light conditioning system 425 in any suitable optical paths.

In the y-z sectional view shown in FIG. 4, the first light 453 may be bounded by first rays 453*a* and 453*b*. For example, the first ray 453*a* may be the rightmost ray of the first light 453, and the first ray 453*b* may be the leftmost ray of the first light 453. The second light 454 may be bounded by second rays 454*a* and 454*b*. For example, the second ray 454*a* may be the leftmost ray of the second light 454, and the second ray 454*b* may be the rightmost ray of the second light 454. In some embodiments, the second ray 454*b* (e.g., the rightmost ray of the second light 454) and the first ray 453*b* (e.g., the leftmost ray of the first light 453) may substantially overlap with each other. The second ray 454*b* and the first ray 453*b* are denoted by a same dashed line in the y-z sectional view shown in FIG. 4.

The light guide 410 may be coupled with one or more in-coupling elements. In some embodiments, each in-coupling element may be polarization selective. In some embodiments, each in-coupling element may include one or more polarization selective gratings. For discussion purposes, each in-coupling element may be referred to as an in-coupling grating. It is understood that in other embodiments, a non-grating structure may be used as the in-coupling element. In the embodiment shown in FIG. 4, the light guide 410 may be coupled with a first in-coupling grating 435-1 and a second in-coupling grating 435-2 configured to couple, via diffraction, the lights 453 and 454 into the light guide 410, respectively. The first in-coupling grating 435-1 and the second in-coupling grating 435-2 may be transmissive PVH gratings configured to forwardly diffract circularly polarized lights having orthogonal polarizations. The light guide 410 may also include one or more out-coupling elements. In some embodiments, each out-coupling element may be polarization selective. In some embodiments, each out-coupling element may include one or more gratings. For discussion purposes, each out-coupling element may be referred to as an out-coupling grating. It is understood that in other embodiments, a non-grating structure may be used as the out-coupling element. In the embodiment shown in FIG. 4, the light guide 410 may be coupled with a first out-coupling grating 445-1 and a second out-coupling grating 445-2. The first out-coupling grating 445-1 and the second out-coupling grating 445-2 may be transmissive PVH gratings configured to primarily forwardly diffract circularly polarized lights having orthogonal polarizations.

Each of the out-coupling gratings 445-1 and 445-2 may have the same polarization selectivity as a corresponding one of the in-coupling gratings 435-1 and 435-2. For illustration and discussion purposes, in the embodiment shown in FIG. 4, the in-coupling grating 435-1 and the out-coupling grating 445-1 may be transmissive PVH gratings having the same polarization selectivity, and the in-coupling grating 435-2 and the out-coupling grating 445-2 may be transmissive PVH gratings having the same polarization selectivity. For example, the in-coupling grating 435-1 and the out-coupling grating 445-1 may be configured to primarily forwardly diffract an RHCP light as an LHCP light, and primarily transmit, with substantially zero or negligible diffraction, an LHCP light as an LHCP light. The in-coupling grating 435-2 and the out-coupling grating 445-2 may be configured to primarily forwardly diffract an LHCP light as an RHCP light, and primarily transmit, with substantially zero or negligible diffraction, an RHCP light as an RHCP light.

For illustrative purposes, FIG. 4 shows that the in-coupling gratings 435-1 and 435-2 are stacked at a first surface 410-1 of the light guide 410, and the out-coupling gratings 445-1 and 445-2 are stacked at a second surface 410-2 of the light guide 410. In some embodiments, the light source assembly 405 and the eye 260 may be arranged at the same side of the light guide 410, and the in-coupling gratings 435-1 and 435-2 may be stacked at the first surface 410-1 of the light guide 410, and the out-coupling gratings 445-1 and 445-2 are stacked at the same first surface 410-1 of the light guide 410. In some embodiments, although not shown in FIG. 4, the in-coupling gratings 435-1 and 435-2 may be disposed side by side at the first surface 410-1 of the light guide 410, and the out-coupling gratings 445-1 and 445-2 may be disposed side by side at the second surface 410-2 of the light guide 410. When disposed side by side, the in-coupling gratings 435-1 and 435-2 and the out-coupling gratings 445-1 and 445-2 may be disposed at the same or different surfaces of the light guide 410. In some embodiments, although not shown in FIG. 4, the embodiment shown in FIG. 4 may include a polarization correction film similar to the polarization correction film 330 shown in FIG. 3.

Referring to FIG. 4, the first light 453 and the second light 454 may be circularly polarized lights with opposite handedness. For example, the first light 453 may be an RHCP light, and the second light 454 may be an LHCP light. In some embodiments, the in-coupling grating 435-1 may be configured to transmit, with substantially zero or negligible diffraction, an LHCP light and forwardly diffract an RHCP light. The in-coupling grating 435-2 may be configured to transmit, with substantially zero or negligible diffraction, an RHCP light and forwardly diffract an LHCP light. Thus, the in-coupling grating 435-2 may be configured to transmit, with substantially zero or negligible diffraction, the first light 453 (e.g., an RHCP light) toward the in-coupling grating 435-1 without changing the polarization. The in-coupling grating 435-1 may be configured to couple, via diffraction, the first light 453 (e.g., an RHCP light) into the light guide 410 as a first TIR propagating light 455 with the polarization changed (e.g., an LHCP light). In some embodiments, the in-coupling grating 435-2 may be configured to couple, via diffraction, the second light 454 (e.g., an LHCP light) into the light guide 410 as a second TIR propagating light 456 with the polarization changed (e.g., an RHCP light). When the light 456 (e.g., an RHCP light) passes through the in-coupling grating 435-1, the in-coupling grating 435-1 may transmit, with substantially zero or negligible diffraction, the light 456 without changing the polarization. For illustrative purposes, FIG. 4 shows one first TIR propagating ray 455a of the first TIR propagating light 455, and one second TIR propagating ray 456a of the second TIR propagating light 456. The first in-coupling grating 435-1 may couple the first ray 453a into the light guide 410 as the first TIR propagating ray 455a. The second in-coupling grating 435-2 may couple the second ray 454a into the light guide 410 as the second TIR propagating ray 456a. The corresponding TIR propagating rays of the first ray 453b and the second ray 454b are not drawn in FIG. 4.

In some embodiments, the light guide 410 may include one or more polarization correction films disposed at one or more surfaces (e.g., one or more outer surfaces) of the light guide 410. The polarization correction films may be configured to maintain the respective polarizations of the first TIR propagating light 455 (e.g., an LHCP light) and the second TIR propagating light 456 (e.g., an RHCP light) when the first TIR propagating light 455 and the second TIR propagating light 456 propagate inside the light guide 410 through TIR. In some embodiments, the polarization correction film may be similar to the polarization correction film 330 shown in FIG. 3.

The out-coupling gratings 445-1 and 445-2 may be configured to forwardly diffract the first and second TIR propagating lights 455 and 456, thereby replicating and expanding the FOV of the image light generated by the light source assembly 405. For example, the out-coupling grating 445-1 may transmit, with substantially zero or negligible diffraction, the TIR propagating light 455 (e.g., an LHCP light) toward the out-coupling gratin 445-2 without changing the polarization. The out-coupling grating 445-2 may be configured to couple, via diffraction, the TIR propagating light 455 (e.g., an LHCP light) out of the light guide 410 as a first output light 457 with the polarization changed (e.g., an RHCP light). The out-coupling grating 445-1 may couple, via diffraction, the TIR propagating light 456 (e.g., an RHCP light) out of the light guide 410 as a second output light 458 with the polarization changed (e.g., an LHCP light). The out-coupling grating 445-2 may transmit, with substantially zero or negligible diffraction, the second output light 458 (e.g., an LHCP light) without changing the polarization.

In the embodiment shown in FIG. 4, the first output light 457 may be bounded by first output rays 457a and 457b, and the second output light 458 may be bounded by second output rays 458a and 458b. In some embodiments, the second out-coupling grating 445-2 may be configured to couple the first TIR propagating ray 455a out of the light guide 410 as a first output ray 457a at a first output angle. In some embodiments, the first in-coupling grating 435-1 may be configured to couple the first ray 453b into the light guide 410 and the second out-coupling grating 445-2 may be configured to couple the first ray 453b out of the light guide 410 as a first output ray 457b. In some embodiments, the first output light 457 may correspond to a first output FOV. The first output FOV may correspond to an angular region bounded by the first output rays 457a and 457b. In some embodiments, the first out-coupling grating 445-1 may be configured to couple the second TIR propagating ray 456a out of the light guide 410 as a second output ray 458a at a second output angle. In some embodiments, the second in-coupling grating 435-1 may be configured to couple the second ray 454b into the light guide 410 and the first out-coupling grating 445-1 may be configured to couple the second ray 454b out of the light guide 410 as a second output ray 458b. In some embodiments, the second output light 458 may correspond to a second output FOV. The second output FOV may correspond to an angular region bounded by the second output rays 458a and 458b. In some embodiments, the first output angle and the second output angle may have a same absolute value and opposite signs, e.g., opposite output angles +θ and −θ. In some embodiments, the first output angle and the second output angle may have different absolute values and opposite signs (e.g., +θ1 and −θ2, with θ1 and θ2 having different values). In some embodiments, the first output ray 457b and the second output ray 458b may substantially overlap with each other.

In a conventional light guide display assembly, the propagation angle in the light guide may correspond, one-to-one, to the diffraction angle of an output light. In the embodiment shown in FIG. 4, a same propagation angle of the TIR path in the light guide 410 may correspond to two different diffraction angles, e.g., two diffraction angles having opposite signs. For example, the first TIR propagating ray 455a and the second TIR propagating ray 456a having substantially the same propagation angle of the TIR path may be diffracted by the out-coupling gratings 445-2 and 445-1 as the first output ray 457a and the second output ray 458a, respectively, where the first output ray 457a and the second output ray 458a have output angles (e.g., diffraction angles) with opposite signs. Thus, the FOV provided by the light guide display assembly 400 may be enlarged or expanded (e.g., doubled) compared to a conventional light guide display assembly when the light guides included in the assemblies are fabricated based on a material with a same or similar refractive index. Alternatively or additionally, compared to a conventional light guide display assembly, a same or similar FOV may be provided by the disclosed light guide display assembly 400 with the light guide 410 fabricated based on a material having a lower refractive index.

The first in-coupling grating 435-1, the light guide 410, and the second out-coupling grating 445-2 may be configured to provide the first output FOV at an eye-box of the light guide display assembly 400. The second in-coupling grating 435-2, the light guide 410, and the first out-coupling grating 445-1 may be configured to provide the second output FOV at the eye-box of the light guide display assembly 400. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV and the second output FOV at the output side of the light guide display assembly 400 may be larger than the predetermined FOV of the image light 450 emitted by the light source 420 (or the combination of the first input FOV of the first light 453 and the second input FOV of the second light 454) at the input side of the light guide display assembly 400. In some embodiments, the first TIR propagating light 455 may correspond to a first intermediate FOV that is smaller than the first input FOV of the first light 453, and the second TIR propagating light 456 may correspond to a second intermediate FOV that is smaller than the second input FOV of the light 454. A combination of the first output FOV and the second output FOV at the output side of the light guide display assembly 400 may be larger than a combined FOV of the first intermediate FOV and the second intermediate FOV.

In some embodiments, when the controller 415 controls the light source assembly 405 to output the first light 453 with the first input FOV and the second light 454 with the second input FOV during the same sub-frame (e.g., simultaneously), the out-coupling elements 445-1 and 445-2 may couple the first light 453 (i.e., 455 when in the light guide 410) and the second light 454 (i.e., 456 when in the light guide 410) out of the light guide 410 as the first output light 457 and the second output light 458 during the same sub-frame. When the controller 415 controls the light source assembly 405 to output the first light 453 with the first input FOV and the second light 454 with the second input FOV during consecutive sub-frames (e.g., a first sub-frame and a second sub-frame), the out-coupling elements 445-1 and 445-2 may couple the first light 453 (i.e., 455 when in the light guide 410) and the second light 454 (i.e., 456 when in the light guide 410) out of the light guide 410 as the first output light 457 and the second output light 458 during the consecutive sub-frames.

Figure 5:
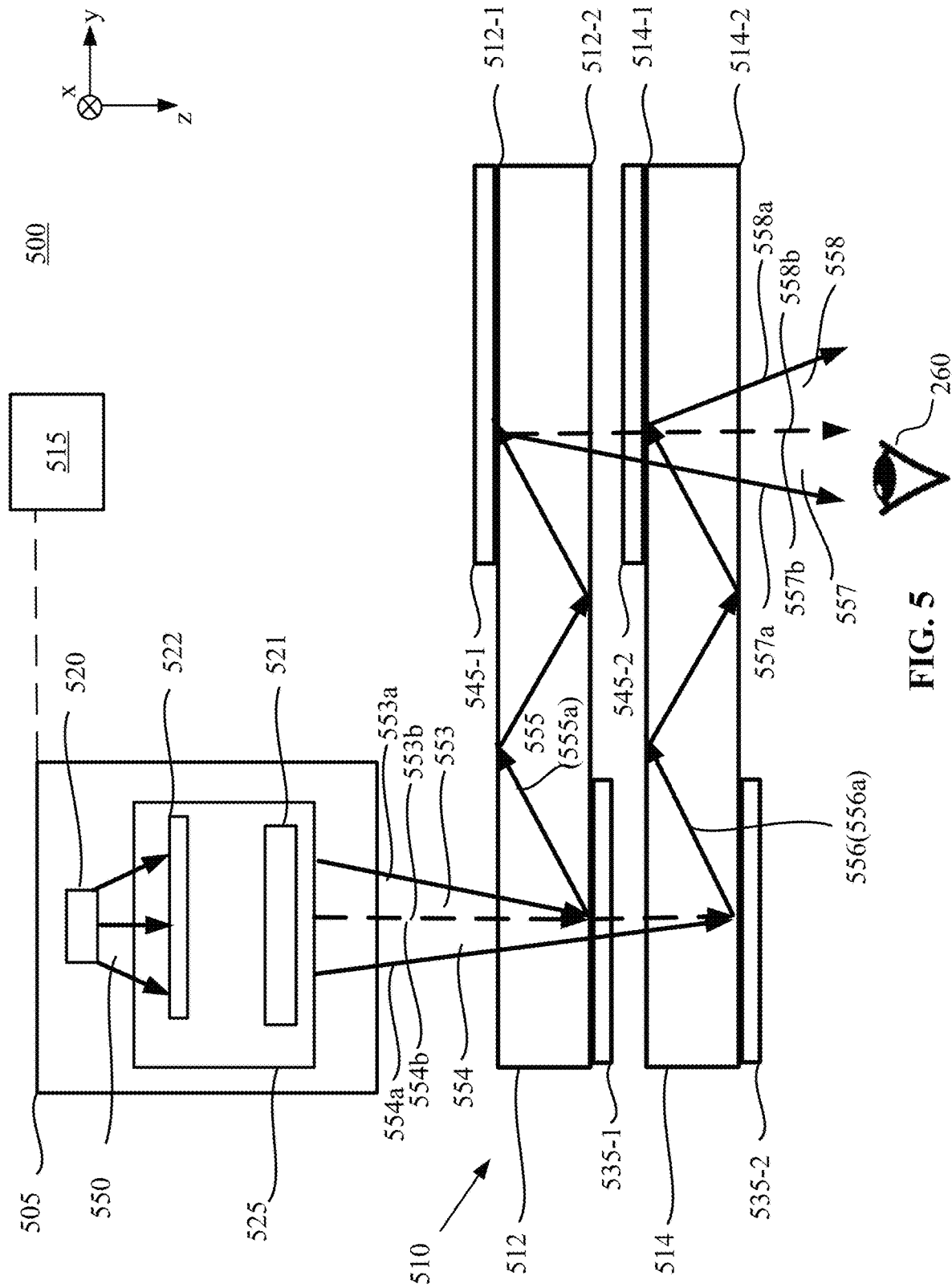
FIG. 5 illustrates a schematic diagram of a light guide display assembly configured to provide an expanded FOV, according to an embodiment of the present disclosure.

FIG. 5 illustrates a schematic diagram of an optical device or system 500 configured to provide an expanded FOV, according to an embodiment of the present disclosure. The optical system 500 may also be referred to as a light guide display assembly 500. The light guide display assembly 500 shown in FIG. 5 may include elements, structures, and/or functions that are the same as or similar to those included in the light guide display assembly 200 shown in FIG. 2A, the light guide display assembly 250 shown in FIG. 2B, the light guide display assembly 300 shown in FIG. 3, or the light guide display assembly 400 shown in FIG. 4. Descriptions of the same or similar elements, structures, and/or functions can refer to the above descriptions rendered in connection with FIG. 2, FIG. 3, or FIG. 4.

As shown in FIG. 5, the light guide display assembly 500 may include a light source assembly 505 and a controller 515, which may include elements, structures, and/or functions similar to or the same as those of the light source assembly 205 and the controller 215 shown in FIG. 2, the light source assembly 305 and the controller 315 shown in FIG. 3, or the light source assembly 405 and the controller 415 shown in FIG. 4. The light source assembly 505 may include a light source 520 and a light conditioning system 525 including a polarization conversion element 522 and a collimator 521, which may be similar to the light source 420 and the light conditioning system 425 including the polarization conversion element 422 and the collimator 421 shown in FIG. 4, the light source 320 and the light conditioning system 325 including the polarization conversion element 322 and the collimator 321 shown in FIG. 3, or the light source 220 and the light conditioning system 225 shown in FIGS. 2A and 2B. Descriptions of the same or similar elements, structures, and/or functions may refer to the above descriptions rendered in connection with FIG. 2A, 2B, 3, or 4. The controller 515 may control various elements included in the light guide display assembly 500, such as the light source assembly 505.

In some embodiments, the light source 520 may generate an image light 550 representing a display image or a virtual image. The image light 550 may be associated with a predetermined FOV. The image light 550 may be unpolarized or polarized. In some embodiments, the image light 550 may be a diverging light. The light conditioning system 525 may be configured to receive the image light 550 from the light source 520, and process the image light 550 to output a first light 553 (or a first input light 553) and a second light 554 (or a second input light 554) configured with desirable properties. For example, the first light 553 may correspond to a first portion of the FOV of the image light 550 (referred to as a first input FOV), and the second light 554 may correspond to a second portion the FOV of the image light 550 (referred to as a second input FOV). The first light 553 and the second light 554 may have orthogonal polarizations. The optical paths of the image light 550 propagating in the light conditioning system 525 are not shown in FIG. 5. The image light 550 may propagate in the light conditioning system 525 in any suitable optical paths.

In the y-z sectional view shown in FIG. 5, the first light 553 with the first input FOV may be bounded by first rays 553a and 553b. For example, the first ray 553a may be the rightmost ray of the first light 553, and the first ray 553b may be the leftmost ray of the first light 553. The second light 554 with the second input FOV may be bounded by second rays 554a and 554b. For example, the second ray 554a may be the leftmost ray of the second light 554, and the second ray 554b may be the rightmost ray of the second light 554. In some embodiments, the second ray 554b (e.g., the rightmost ray of the second light 554) and the first ray 553b (e.g., the leftmost ray of the first light 553) may substantially overlap with each other.

The light guide display assembly 500 may include a light guide stack 510 having a plurality of light guides stacked together. FIG. 5 shows two light guides, a first light guide 512 and a second light guide 514 stacked together to form the light guide stack 510. Other suitable number of light guides may be included in some embodiments, such as three, four, five, etc. Each of the light guides 512 and 514 may be an embodiment of (or may be similar to) the light guide 210 shown in FIG. 2, the light guide 310 shown in FIG. 3, or the light guide 410 shown in FIG. 4. A light with a predetermined FOV (e.g., equal to or larger than 40°) may be configured as two portions or components with orthogonal polarizations (e.g., first and second lights with orthogonal polarizations) corresponding to different portions of the FOV. The light guide stack 510 may be configured to receive the first light as a first input light, and the second light as a second input light. The first and second input light may have orthogonal polarizations.

The light guide stack 510 may include one or more in-coupling elements coupled with one or more light guides. In some embodiments, each in-coupling element may be polarization selective. In some embodiments, each in-coupling element may include one or more polarization selective gratings. For discussion purposes, each in-coupling element may be referred to as an in-coupling grating. It is understood that in other embodiments, a non-grating structure may be used as the in-coupling element. In the embodiment shown in FIG. 5, the light guide stack 510 may include a first polarization selective in-coupling grating 535-1 and a second polarization selective in-coupling grating 535-2 coupled to the light guide 512 and the light guide 514, respectively. The first in-coupling grating 535-1 and the second polarization selective in-coupling grating 535-2 may be configured to couple, via diffraction, the first and second input lights into the first and second light guides 512 and 514, respectively. The first and second input lights may propagate inside the respective light guides through TIR, at a substantially same propagation angle. The respective polarizations of the first and second input lights may be maintained by one or more polarization correction films (e.g., similar to the polarization correction film 330 shown in FIG. 3) while propagating inside the respective light guides through TIR.

The light guide stack 510 may also include one or more out-coupling elements coupled with the light guides 512 and 514. In some embodiments, each out-coupling element may be polarization selective. In some embodiments, each out-coupling element may include one or more polarization selective gratings. For discussion purposes, each out-coupling element may be referred to as an out-coupling grating. It is understood that in other embodiments, a non-grating structure may be used as the out-coupling element. In the embodiment shown in FIG. 5, the light guide stack 510 includes two polarization selective out-coupling gratings, a first out-coupling grating 545-1 and a second out-coupling grating 545-2, coupled with the light guides 512 and 514, respectively. The first out-coupling grating 545-1 and the second out-coupling grating 545-2 may be configured to couple, via diffraction, the first and second lights out of the light guides 512 and 514 in different directions, respectively. In some embodiments, each of the in-coupling gratings 535-1 and 535-2 and each of the out-coupling gratings 545-1 and 545-2 may be a transmissive type grating (e.g., a transmissive PVH) or a reflective type grating (e.g., a reflective PVH).

The light guide stack 510 may be configured to receive the first light 553 as a first input light, and the second light 554 as a second input light. In some embodiments, the light guide 512 may be coupled with the in-coupling grating 535-1 and the out-coupling grating 545-1. Each of the in-coupling grating 535-1 and the out-coupling grating 545-1 may be disposed at a first surface 512-1 or a second surface 512-2 of the light guide 512. For illustrative purposes, the in-coupling grating 535-1 is shown as being disposed at the second surface 512-2 and the out-coupling grating 545-1 is shown as being disposed at the first surface 512-1. The light guide 514 may be coupled with the in-coupling grating 535-2 and the out-coupling grating 545-2. Each of the in-coupling grating 535-2 and the out-coupling grating 545-2 may be disposed at a first surface 514-1 or a second surface 514-2 of the light guide 514. For illustrative purposes, the in-coupling grating 535-2 is shown as being disposed at the second surface 514-2 and the out-coupling grating 545-2 is shown as being disposed at the first surface 514-1. The number of in-coupling gratings and out-coupling gratings coupled with the light guide 512 or the light guide 514 is not limited to one for each type, and may be any suitable number, such as two, three, four, etc. When two or more in-coupling gratings and/or two or more out-coupling gratings are coupled with each of the light guides 512 and 514, the configuration of the in-coupling gratings and the out-coupling gratings may adopt the configuration shown in FIG. 2, FIG. 3, or FIG. 4, or a combination thereof.

In some embodiments, the in-coupling gratings 535-1 and 535-2 may be embodiments of (or may be similar to) the in-coupling gratings 335-1 and 335-2 shown in FIG. 3, or the in-coupling gratings 435-1 and 435-2 shown in FIG. 4. The out-coupling gratings 545-1 and 545-2 may be embodiments of (or may be similar to) the out-coupling gratings 345-1 and 345-2 shown in FIG. 3, or the out-coupling gratings 445-1 and 445-2 shown in FIG. 4. In some embodiments, as shown in FIG. 5, the in-coupling gratings 535-1 and 535-2 may be reflective PVH gratings configured to primarily backwardly diffract circularly polarized lights with opposite handednesses, and the out-coupling gratings 545-1 and 545-2 may be reflective PVH gratings configured to primarily backwardly diffract circularly polarized lights with opposite handednesses. In some embodiments, the out-coupling gratings 545-1 and 545-2 may have the same polarization selectivity as the in-coupling gratings 535-1 and 535-2, respectively. In some embodiments, for a wave guiding to take place in a light guide, the light guides 512 and 514 may be separated by air gaps. In some embodiments, the air gaps between the light guides 512 and 514 may be at least partially filled with a material (e.g., an adhesive) having a refractive index lower than that of the light guides.

In some embodiments, the in-coupling grating 535-1 may be configured to couple, via diffraction, the first light 553 (e.g., an RHCP light) into the light guide 512 as a first TIR propagating light 555 without changing the polarization (e.g., an RHCP light), and transmit, with substantially zero or negligible diffraction, the second light 554 (e.g., an LHCP light) toward the in-coupling grating 535-2 of the light guide 514 without changing the polarization. The first TIR propagating light 555 (e.g., an RHCP light) may propagate inside the light guide 512 through TIR toward the out-coupling grating 545-1. The in-coupling grating 535-2 may be configured to couple, via diffraction, the second light 554 (e.g., an LHCP light) into the light guide 514 as a second TIR propagating light 556 without changing the polarization (e.g., an LHCP light). The second TIR propagating light 556 (e.g., an LHCP light) may propagate inside the light guide 514 through TIR toward the out-coupling grating 545-2. For illustrative purposes, FIG. 5 shows one first TIR propagating ray 555a of the first TIR propagating light 555, and one second TIR propagating ray 556a of the second TIR propagating light 556. The first in-coupling grating 535-1 may couple the first ray 553a into the light guide 512 as the first TIR propagating ray 555a. The second in-coupling grating 535-2 may couple the second ray 554a into the light guide 514 as the second TIR propagating ray 556a. The corresponding TIR propagating rays of the first ray 553b and the second ray 554b are not drawn in FIG. 5.

In some embodiments, the light guide 512 and the light guide 514 may include one or more polarization correction films disposed at one or more surfaces (e.g., one or more outer surfaces) of the respective light guides. The polarization correction films may be configured to maintain the respective polarizations of the TIR propagating light 555 (e.g., an RHCP light) and the TIR propagating light 556 (e.g., an LHCP light) when the first TIR propagating light 555 and the second TIR propagating light 556 propagate inside the respective light guides. In some embodiments, the polarization correction film may be similar to the polarization correction film 330 shown in FIG. 3.

The out-coupling grating 545-1 may be configured to couple, via diffraction, the first TIR propagating light 555 (e.g., an RHCP light) out of the light guide 512 as a first output light 557 without changing the polarization (e.g., an RHCP light), which may propagate toward the eye 260 after passing through the out-coupling grating 545-2 and the light guide 514, which may not change the polarization of the first output light 557. The out-coupling grating 545-2 may be configured to couple, via diffraction, the second TIR propagating light 556 (e.g., an LHCP light) out of the light guide 514 as a second output light 558 (e.g., an LHCP light) propagating toward the eye 260.

In the embodiment shown in FIG. 5, the first output light 557 may be bounded by first output rays 557a and 557b, and the second output light 558 may be bounded by second output rays 558a and 558b. In some embodiments, the first out-coupling grating 545-1 may be configured to couple the first TIR propagating ray 555a out of the light guide 512 as a first output ray 557a at a first output angle. In some embodiments, the first in-coupling grating 535-1 may be configured to couple the first ray 553b into the light guide 512 and the first out-coupling grating 545-1 may be configured to couple the first ray 553b out of the light guide 512 as a first output ray 557b. In some embodiments, the first output light 557 may correspond to a first output FOV. The first output FOV may correspond to an angular region bounded by the first output rays 557a and 557b. In some embodiments, the second out-coupling grating 545-2 may be configured to couple the second TIR propagating ray 556a out of the light guide 514 as a second output ray 558a at a second output angle. In some embodiments, the second in-coupling grating 535-1 may be configured to couple the second ray 554b into the light guide 514 and the second out-coupling grating 545-2 may be configured to couple the second ray 554b out of the light guide 514 as a second output ray 558b. In some embodiments, the second output light 558 may correspond to a second output FOV. The second output FOV may correspond to an angular region bounded by the second output rays 558a and 558b. In some embodiments, the first output angle of the first output ray 557a and the second output angle of the second output ray 558a may have a same absolute value and opposite signs, e.g., opposite output angles $+\theta$ and $-\theta$. In some embodiments, the first output angle of the first output ray 557a and the second output angle of the second output ray 558a may have different absolute values and opposite signs (e.g., $+\theta 1$ and $-\theta 2$, with $\theta 1$ and $\theta 2$ having different values). In some embodiments, the first output ray 557b and the second output ray 558b may substantially overlap with each other.

In a conventional light guide display assembly, the propagation angle in the light guide may correspond, one-to-one, to the diffraction angle of an output light. In the embodiment shown in FIG. 5, a same propagation angle of the TIR path in the light guides 512 and 514 may correspond to two different diffraction angles, e.g., two diffraction angles having opposite signs. For example, the first TIR propagating ray 555a and the second TIR propagating ray 556a having substantially the same propagation angle of the TIR path may be diffracted by the out-coupling gratings 545-1 and 545-2 as the first output ray 557a at a first output angle and as the second output ray 558a at a second output angle, respectively. The first and second output angles (or diffraction angles) may have the same or different absolute values and opposite signs. Thus, the FOV provided by the light guide display assembly 500 may be enlarged or expanded (e.g., doubled) compared to a conventional light guide display assembly including stacked light guides fabricated based on a material with a same or similar refractive index. Additionally or alternatively, compared to a conventional light guide stack, a same or similar FOV may be provided by the disclosed light guide display assembly 500 with light guides fabricated based on a material with a lower refractive index.

The first in-coupling grating 535-1, the light guide 512, and the first out-coupling grating 545-1 may be configured to provide the first output FOV at an eye-box of the light guide display assembly 500. The second in-coupling grating 535-2, the light guide 514, and the second out-coupling grating 545-2 may be configured to provide the second output FOV at the eye-box of the light guide display assembly 500. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV and the second output FOV at the output side of the light guide display assembly 500 may be larger than the predetermined FOV of the image light 550 emitted by the light source 520 (or the combination of the first input FOV of the first light 553 and the second input FOV of the second light 554) at the input side of the light guide display assembly 500. In some embodiments, the first TIR propagating light 555 may correspond to a first intermediate FOV that is smaller than the first input FOV of the first light 553, and the second TIR propagating light 556 may correspond to a second intermediate FOV that is smaller than the second input FOV of the second light 554. The combination of the first output FOV and the second output FOV at the output side of the light guide display assembly 500 may be larger than a combination of the first intermediate FOV and the second intermediate FOV.

In some embodiments, when the controller 515 controls the light source assembly 505 to output the first light 553 with the first input FOV and the second light 554 with the second input FOV during the same sub-frame (e.g., simultaneously), the out-coupling elements 545-1 and 545-2 may couple the first light 553 (i.e., 555 when in the light guide 512 of the light guide display assembly 510) and the second light 554 (i.e., 556 when in the light guide 514 of the light guide display assembly 510) out of the light guides 512 and 514 as the first output light 557 and the second output light 558 during the same sub-frame. When the controller 515 controls the light source assembly 505 to output the first light 553 with the first input FOV and the second light 554 with the second input FOV during consecutive sub-frames (e.g., a first sub-frame and a second sub-frame), the out-coupling elements 545-1 and 545-2 may couple the first light 553 (i.e., 555 when in the light guide 512) and the second light 554 (i.e., 556 when in the light guide 514) out of the light guide 512 and the light guide 514 as the first output light 557 and the second output light 558 during the consecutive sub-frames, respectively.

Figure 6A:
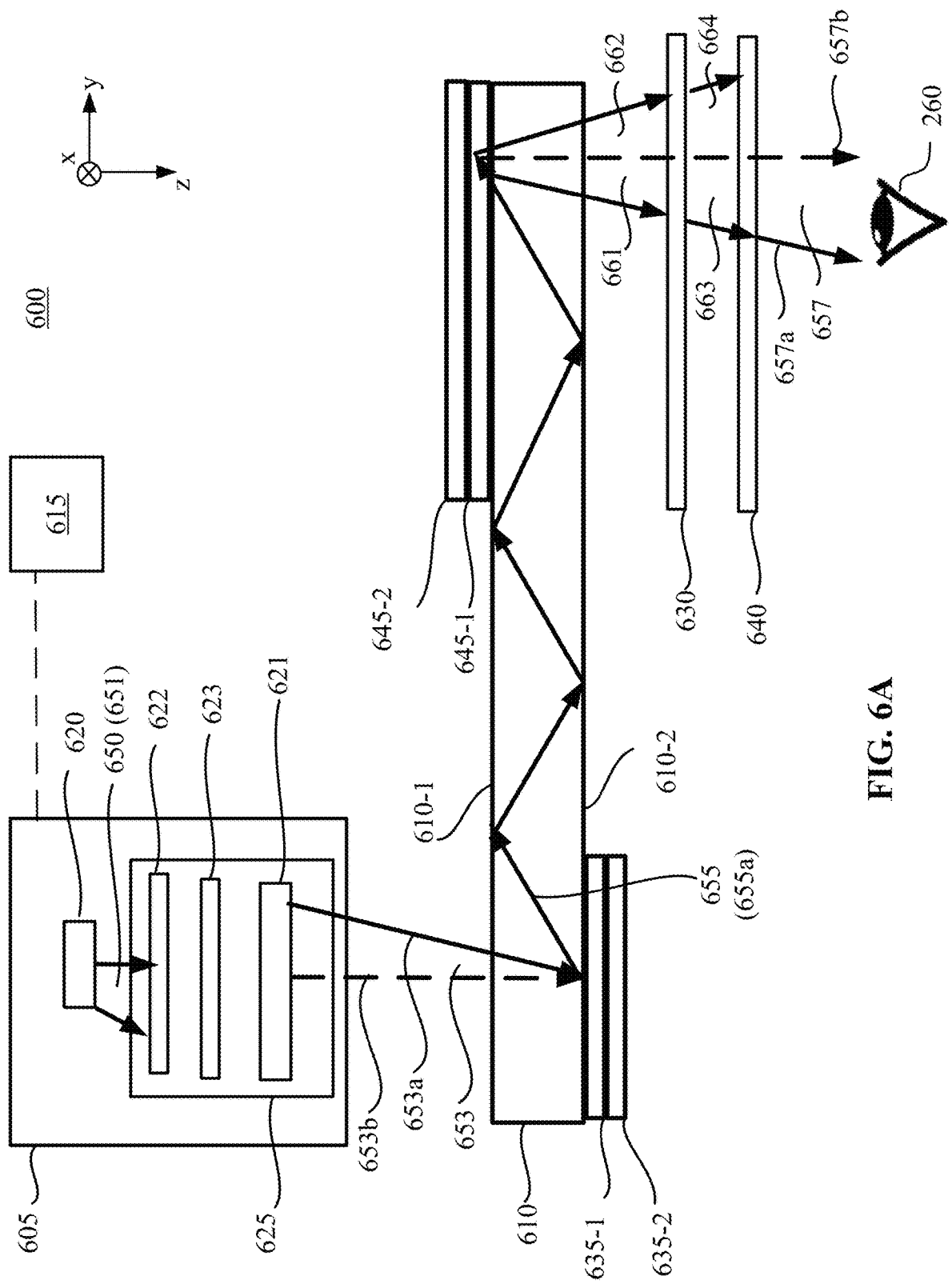
FIGS. 6A and 6B illustrate a schematic diagram of a light guide display assembly configured to provide an expanded FOV, according to another embodiment of the present disclosure.
Figure 6B:
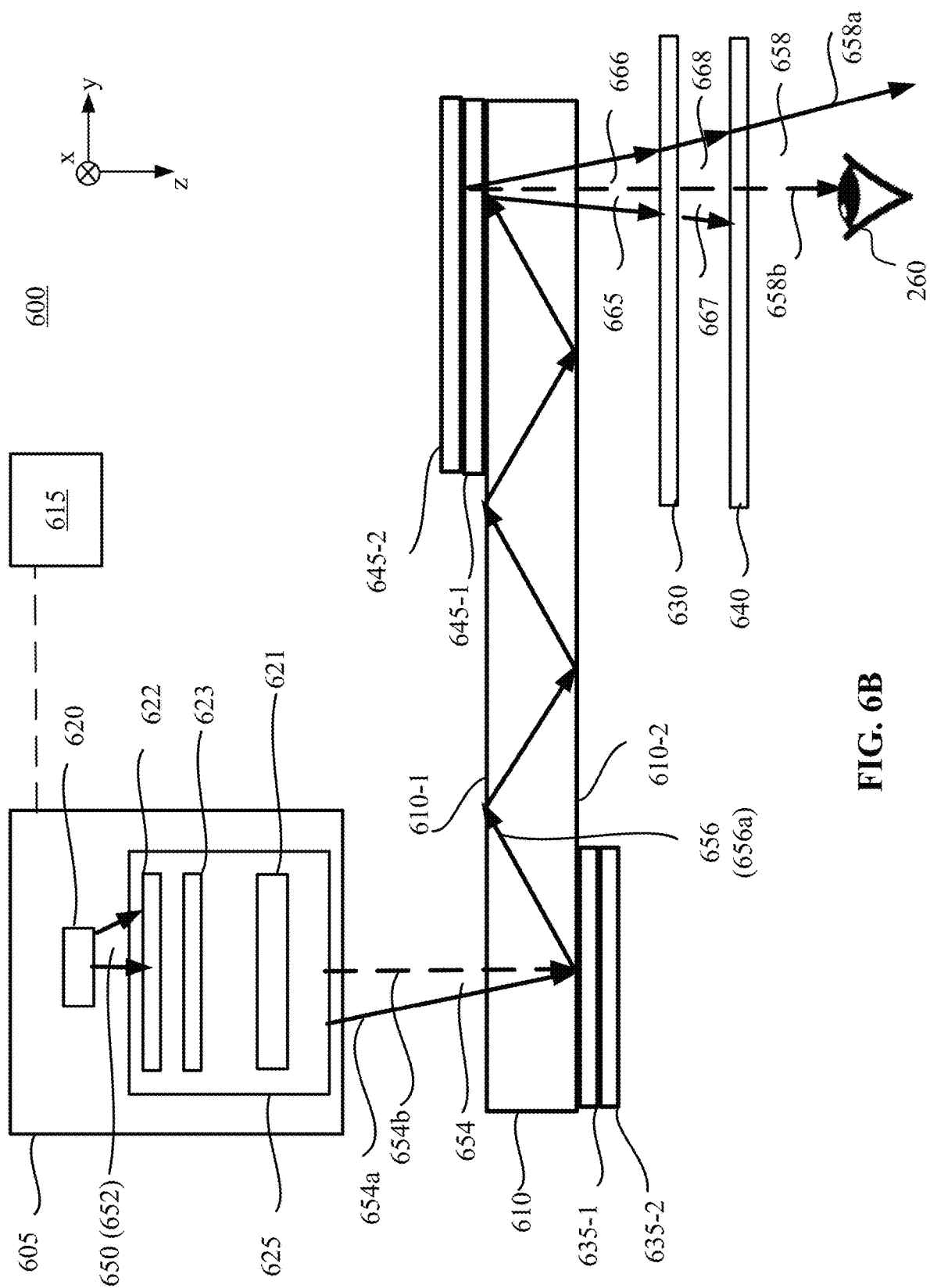

FIGS. 6A and 6B illustrate a schematic diagram of an optical device or system 600 configured to provide an expanded FOV, according to another embodiment of the present disclosure. The optical system 600 may also be referred to as a light guide display assembly 600. The light guide display assembly 600 shown in FIGS. 6A and 6B may include elements, structures, and/or functions that are the same as or similar to those included in the light guide display assembly 200 shown in FIG. 2A, the light guide display assembly 250 shown in FIG. 2B, the light guide display assembly 300 shown in FIG. 3, the light guide display assembly 400 shown in FIG. 4, or the light guide display assembly 500 shown in FIG. 5. Descriptions of the same or similar elements, structures, and/or functions can refer to the above descriptions rendered in connection with FIG. 2A, FIG. 2B, FIG. 3, FIG. 4, or FIG. 5.

As shown in FIGS. 6A and 6B, the light guide display assembly 600 may include a light source assembly 605, a light guide 610, and a controller 615, which may be embodiments of (or may be similar to) the light source assembly 205, light guide 210, and the controller 215 shown in FIGS. 2A and 2B, the light source assembly 305, light guide 310, and the controller 315 shown in FIG. 3, the light source assembly 405, the light guide 410, and the controller 415 shown in FIG. 4, or the light source 505, the light guides 512 and 514, and the controller 515 shown in FIG. 5.

The light source assembly 605 may include a light source 620 and a light conditioning system 625 including a polarization conversion element 622 and a collimator 621, which may be similar to the light source 520 and the light conditioning system 525 including the polarization conversion element 522 and the collimator 521 shown in FIG. 5, the light source 420 and the light conditioning system 425 including the polarization conversion element 422 and the collimator 421 shown in FIG. 4, the light source 320 and the light conditioning system 325 including the polarization conversion element 322 and the collimator 321 shown in FIG. 3, or the light source 220 and the light conditioning system 225 shown in FIGS. 2A and 2B. Descriptions of the same or similar elements, structures, and/or functions may refer to the above descriptions rendered in connection with FIG. 2A, FIG. 2B, FIG. 3, FIG. 4, or FIG. 5.

A light with a predetermined FOV (e.g., equal to or larger than 40°) may be configured as two portions with orthogonal polarizations (e.g., first and second lights with orthogonal polarizations) corresponding to different portions of the FOV. The light source assembly 605 may be configured to output the first and second lights with orthogonal polarizations in a time-sequential manner (e.g., during two consecutive sub-frames of a display frame), which may be realized by a first polarization switch 623 coupled to the light source 620. With the first polarization switch 623, the light source assembly 605 may output the first light with a first polarization and the second light with the second polarization during the two consecutive sub-frames, respectively. The first polarization and the second polarization may be orthogonal polarizations. In some embodiments, the first polarization switch 623 may be included in the light conditioning system 625.

The light guide 610 may be configured to receive the first light having the first polarization as a first input light and the second light having the second polarization as a second input light during the two consecutive sub-frames, respectively. The light guide 610 may be coupled with one or more in-coupling elements. In some embodiments, each in-coupling element may be polarization selective. In some embodiments, each in-coupling element may include one or more gratings. For discussion purposes, the in-coupling element may be referred to as an in-coupling grating. It is understood that in other embodiments, a non-grating structure may be used as the in-coupling element. In the embodiment shown in FIG. 6A, two polarization selective in-coupling gratings, a first in-coupling grating 635-1 and a second in-coupling grating 635-2, are coupled with the light guide 610. The number of the in-coupling gratings is not limited to two, and can be any suitable number, such as one, three, four, five, six, etc. The first in-coupling grating 635-1 and the second in-coupling grating 635-2 may be configured to couple, via diffraction, the first and second input lights having orthogonal polarizations into the light guide 610 during the two consecutive sub-frames, respectively. The first input light and the second input light may propagate inside the light guide 610 through TIR during the two consecutive sub-frames, respectively.

The light guide 610 may also be coupled with one or more out-coupling elements. In some embodiments, each out-coupling element may be polarization selective. In some embodiments, each out-coupling element may include one or more polarization selective gratings. For discussion purposes, each out-coupling element may be referred to as an out-coupling grating. It is understood that in other embodiments, a non-grating structure may be used as the out-coupling element. In the embodiment shown in FIG. 6A, two out-coupling gratings, a first out-coupling grating 645-1 and a second out-coupling grating 645-2, are coupled with the light guide 610. Each of the in-coupling gratings 635-1 and 635-2 and the out-coupling gratings 645-1 and 645-2 may be a transmissive type grating (e.g., a transmissive PVH) or a reflective type grating (e.g., a reflective PVH).

The first input light having the first polarization and the second input light having the second polarization may propagate inside the light guide 610 from the in-coupling gratings 635-1 and 635-2 toward the out-coupling gratings 645-1 and 645-2 as a first TIR propagating light and a second TIR propagating light during the two consecutive sub-frames, respectively. In some embodiments, the first TIR propagating light may have the first polarization as an initial polarization, and the second TIR propagating light may have the second polarization as an initial polarization. The polarizations of the first and second TIR propagating lights may not be maintained (i.e., may change from the respective initial polarizations) when propagating inside the light guide 610 through TIR. When the first TIR propagating light arrives at the first out-coupling element and/or the second out-coupling element, the first TIR propagating light may include a first polarized component and a second polarized component. The first polarized component may have the first polarization and the second polarized component may have the second polarization. Hence, the first polarized component and the second polarized component may be referred to as orthogonally polarized components. When the second TIR propagating light arrives at the first out-coupling element and/or the second out-coupling element, the second TIR propagating light may include a first polarized component and a second polarized component, similar to the first TIR propagating light. Thus, during each of the two consecutive sub-frames, the two polarization selective out-coupling gratings 645-1 and 645-2 may couple, via diffraction, two orthogonally polarized components of a corresponding TIR propagating light out of the light guide 610 as two orthogonally polarized output lights, respectively.

For example, at a first sub-frame, when the first TIR propagating light arrives at the out-coupling grating 645-1 and the out-coupling grating 645-2, the first TIR propagating light may have a first polarized component (e.g., an RHCP component), and a second polarized component (e.g., an LHCP component). The out-coupling grating 645-1 and the out-coupling grating 645-2 may couple, via diffraction, the first polarized component (e.g., the RHCP component) and the second polarized component (e.g., the LHCP component) of the first TIR propagating light out of the light guide 610 as a first RHCP output light and a first LHCP output light, respectively. At a second sub-frame, when the second TIR propagating light arrives at the out-coupling grating 645-1 and the out-coupling grating 645-2, the second TIR propagating light may have a first polarized component (e.g., an RHCP component), and a second polarized component (e.g., an LHCP component). The out-coupling grating 645-1 and the out-coupling grating 645-2 may couple, via diffraction, the first polarized component (e.g., the RHCP component) and the second polarized component (e.g., the LHCP component) of the second TIR propagating light out of the light guide 610 as a second RHCP output light and a second LHCP output light, respectively. In each sub-frame, the two orthogonally polarized output lights may form two images, one of which may be a primary image and the other may be a ghost image. The ghost image may be suppressed or eliminated via a second polarization switch 630 and an absorptive polarizer 640 disposed between the out-coupling gratings 645-1 and 645-2 (or light guide 610) and the eye 260.

The controller 615 may control various elements included in the light guide display assembly 600, such as the light source assembly 605, the first polarization switch 623, and the second polarization switch 630. For example, the controller 615 may control the operation states of the first polarization switch 623 and the second polarization switch 630 to synchronize the operation states. That is, the operation state (e.g., switching state or non-switching state) of the second polarization switch 630 may be controlled to be the same as the operation state of the first polarization switch 623. When the first polarization switch 623 is controlled by the controller 615 to change the operation state, the second polarization switch 630 may be simultaneously controlled by the controller 615 to change the operation state to match the operation state of the first polarization switch 623.

In some embodiments, referring to FIGS. 6A and 6B, the light source 620 may emit an image light 650 (representing a virtual image or a display image) with a predetermined FOV (e.g., equal to or larger than 40°), e.g., corresponding to a display image with the predetermined FOV (e.g., equal to or larger than 40°). The image light 650 may be unpolarized or polarized. In some embodiments, the image light 650 may be a diverging light. The image light 650 with the predetermined FOV (e.g., equal to or larger than 40°) may be configured as two portions 651 (shown in FIG. 6A) and 652 (shown in FIG. 6B) (e.g., a first light 651 and a second light 652) corresponding to different portions of the FOV of the image light emitted by the light source 620. The light source 620 may be controlled by the controller 615 to emit the two lights 651 and 652 corresponding to different portions of the FOV in a time-sequential manner. For example, a display frame of the display image generated by the light source 620 may include two consecutive sub-frames, a first sub-frame and a second sub-frame. The controller 615 may control the light source 620 to emit the light 651 corresponding to a first portion of the FOV of the image light 650 (referred to as a first input FOV) during the first sub-frame, as shown in FIG. 6A, and emit the light 652 corresponding to a second portion of the FOV of the image light 650 (referred to as a second input FOV) during the second sub-frame, as shown in FIG. 6B.

The light conditioning system 625 may be configured to receive the light 651 from the light source 620 and process the light 651 to output a first light 653 (or a first input light 653) during the first sub-frame, and receive the light 652 from the light source 620 and process the light 652 to output a second light 654 (or a second input light 654) during the second sub-frame. In some embodiments, the properties of the lights 653 and 654 may be similar to that of the light 353 and the light 354 shown in FIG. 3, respectively. For example, the first light 653 may correspond to a first portion of the FOV of the image light 650 (referred to as a first input FOV), and the second light 654 may correspond to a second portion of the FOV of the image light 650 (referred to as a second input FOV). The first light 653 and the second light 654 may have orthogonal polarizations. The optical paths of the image light 650 propagating in the light conditioning system 625 are not shown in FIGS. 6A and 6B. The image light 650 may propagate in the light conditioning system 625 in any suitable optical paths. In the y-z sectional view shown in FIG. 6A, the first light 653 may be bounded by first rays 653a and 653b. For example, the first ray 653a may be the rightmost ray of the first light 653, and the first ray 653b may be the leftmost ray of the first light 653. In the y-z sectional view shown in FIG. 6B, the second light 654 may be bounded by second rays 654a and 654b. For example, the second ray 654a may be the leftmost ray of the second light 654, and the second ray 654b may be the rightmost ray of the second light 654.

In some embodiments, the light conditioning system 625 may include the first polarization switch 623, which may be an active element configured to maintain a polarization of an incident light or switch a polarization of an incident light to an orthogonal polarization, depending on an operation state (e.g., switching or non-switching state) of the first polarization switch 623. The controller 615 may be configured to control the operation state of the first polarization switch 623. In some embodiment, the first polarization switch 623 may be configured to maintain a handedness of a circularly polarized incident light or switch a handedness of a circularly polarized incident light to an opposite handedness, depending on the operation state (e.g., switching or non-switching state) of the first polarization switch 623. In some embodiments, the light conditioning system 625 may also include a polarization conversion element 622 configured to polarize the image light 650 before the image light 650 is incident onto the first polarization switch 623. In some embodiments, the polarization conversion element 622 may be a switchable waveplate, as described above in connection with the polarization conversion element 322. The operation state (e.g., switching state or non-switching state) of the switchable polarization conversion element 622 may be controlled by the controller 615.

The light conditioning system 625 may also include a collimator 621 (e.g., a collimating lens). For illustrative purposes, FIGS. 6A and 6B show that the first polarization switch 623 is arranged between the polarization conversion element 622 and the collimator 621. Although not shown, in some embodiments, the polarization conversion element 622 may be arranged between the first polarization switch 623 and the collimator 621. The polarization conversion element 622 may be configured to polarize a light output from the first polarization switch 623 into a predetermined polarization, e.g., a circular polarization. In some embodiments, the polarization conversion element 622 may be omitted. In some embodiments, the first polarization switch 623 may not be a part of the light source assembly 605, and may be disposed between the light source assembly 605 and the light guide 610. In some embodiments, the first polarization switch 623 may not be a part of the light source assembly 605. Instead, the first polarization switch 623 may be a part of the light guide 610. For example, in some embodiments, the first polarization switch 623 may be disposed at a surface of the light guide 610.

In some embodiments, the first polarization switch 623 may include a switchable half-wave plate ("SHWP"). For example, the light source 620 may be configured to emit a circularly polarized light with a first handedness toward the first polarization switch 623. In some embodiments, the polarization conversion element 622 may be omitted. The first polarization switch 623 (e.g., SHWP) may be controlled by the controller 615 to operate in the non-switching state to maintain the handedness of the circularly polarized light. The first polarization switch 623 (e.g., SHWP) may be controlled by the controller 615 to operate in the switching state to switch the handedness of the circularly polarized light from the first handedness to a second handedness opposite to the first handedness.

In some embodiments, the light source 620 may be configured to emit a linearly polarized light, and the polarization conversion element 622 may include a quarter-wave plate ("QWP") configured to convert the linearly polarized light into a circularly polarized light with the first handedness. In some embodiments, the light source 620 may be configured to emit an unpolarized light, and the polarization conversion element 622 may include a linear polarizer and the QWP. The linear polarizer may be configured to convert the unpolarized light into a linearly polarized light. The QWP may be configured to convert the linearly polarized light to a circularly polarized light with the first handedness. In some embodiments, when the light source 620 emits an unpolarized light, the combination of the linear polarizer and the QWP in the polarization conversion element 622 may be replaced by a circular polarizer.

In some embodiments, the light guide 610 may be coupled with one or more in-coupling elements. In some embodiments, each in-coupling element may be polarization selective. In some embodiments, each in-coupling element may include one or more gratings. For discussion purposes, each in-coupling element may be referred to as an in-coupling grating. It is understood that in other embodiments, a non-grating structure may be used as the in-coupling element. FIG. 6A shows that two in-coupling gratings, a first in-coupling grating 635-1 and a second in-coupling grating 635-2, are coupled with the light guide 610. Each of the first in-coupling grating 635-1 and the second in-coupling grating 635-2 may be disposed at a first surface 610-1 or a second surface 610-2 of the light guide 610. The light guide 610 may be coupled with one or more out-coupling element. In some embodiments, each out-coupling element may be polarization selective. In some embodiments, each out-coupling element may include one or more gratings. For discussion purposes, each out-coupling element may be referred to as an out-coupling grating. It is understood that in other embodiments, a non-grating structure may be used as the out-coupling element. FIG. 6A shows that two out-coupling gratings, a first out-coupling grating 645-1 and a second out-coupling grating 645-2, are coupled with the light guide 610. Each of the out-coupling grating 645-1 and the second out-coupling grating 645-2 may be disposed at the first surface 610-1 or the second surface 610-2 of the light guide 610. For illustrative purposes, FIGS. 6A and 6B show that the in-coupling gratings 635-1 and 635-2 are stacked at the second surface 610-2 of the light guide 610, and the out-coupling gratings 645-1 and 645-2 are stacked at the first surface 610-1 of the light guide 610.

The in-coupling gratings 635-1 and 635-2 may be embodiments of (or may be similar to) the in-coupling gratings 335-1 and 335-2 shown in FIG. 3, the in-coupling gratings 435-1 and 435-2 shown in FIG. 4, or the in-coupling gratings 535-1 and 535-2 shown in FIG. 5. The out-coupling gratings 645-1 and 645-2 may be embodiments of (or may be similar to) the out-coupling gratings 345-1 and 345-2 shown in FIG. 3, the out-coupling gratings 445-1 and 445-2 shown in FIG. 4, or the out-coupling gratings 545-1 and 545-2 shown in FIG. 5. In some embodiments, each of the in-coupling gratings 635-1, 635-2 and each of the out-coupling gratings 645-1 and 645-2 may be a transmissive type grating (e.g., a transmissive PVH grating) or a reflective type grating (e.g., a reflective PVH grating). In the embodiment shown in FIGS. 6A and 6B, the in-coupling gratings 635-1 and 635-2 may be reflective PVH gratings configured to backwardly diffract circularly polarized lights with orthogonal polarizations, and the out-coupling gratings 645-1 and 645-2 may be reflective PVH gratings configured to backwardly diffract circularly polarized lights with orthogonal polarizations. The out-coupling gratings 645-1 and 645-2 may have the same polarization selectivity as the in-coupling gratings 635-1 and 635-2, respectively.

In some embodiments, the light guide 610 may be coupled with the second polarization switch 630 and the absorptive polarizer 640 that are configured to suppress the ghost image. The second polarization switch 630 may be disposed between the absorptive polarizer 640 and the light guide 610, and the absorptive polarizer 640 may be disposed between the second polarization switch 630 and the eye 260. The second polarization switch 630 may be an embodiment of (or may be similar to) the first polarization switch 623, and may be synchronized with the first polarization switch 623. For example, both of the second polarization switch 630 and the first polarization switch 623 may be controlled by the controller 615 to operate in the switching state during one of the first and second sub-frames, and to operate in the non-switching state during the other of the first and second sub-frames. In some embodiments, the second polarization switch 630 may not be synchronized with the first polarization switch 623. For example, the second polarization switch 630 and the first polarization switch 623 may be configured to operate in the switching state during different sub-frames, and to operate in the non-switching state during different sub-frames. In other words, in a sub-frame, one of the first polarization switch 623 and the second polarization switch 630 may operate in the switching state, and the other one of the first polarization switch 623 and the second polarization switch 630 may operate in the non-switching state. The absorptive polarizer 640 may be configured to block a light forming the ghost image via absorption, and transmit a light forming the primary image. In some embodiments, the absorptive polarizer 640 may be a circular polarizer. In some embodiments, the absorptive polarizer 640 may be a linear polarizer, and a QWP may be disposed between the absorptive polarizer 640 and the second polarization switch 630. The QWP may be configured to convert a circularly polarized light into a linearly polarized light or vice versa.

Referring to FIG. 6A, during a first sub-frame of a display frame, the light source 620 may output the light 651 toward the polarization conversion element 622. In some embodiments, the light 651 may correspond to a first portion of the FOV of the image light 650 (referred to as the first input FOV). For illustrative purposes, the light 651 may be an unpolarized light or a linearly polarized light. The polarization conversion element 622 may be configured to polarize the light 651 into a circularly polarized light (e.g., an RHCP light). The circularly polarized light (e.g., an RHCP light) may propagate toward the first polarization switch 623 (e.g., SHWP). The first polarization switch 623 (e.g., SHWP) may be configured to operate in the non-switching state to transmit the circularly polarized light (e.g., an RHCP light) without affecting the polarization. For example, the first polarization switch 623 (e.g., SHWP) may transmit the circularly polarized light (e.g., an RHCP light) received from the polarization conversion element 622 as a circularly polarized light without changing the polarization (e.g., an RHCP light). The in-coupling grating 635-1 may be configured to couple, via diffraction, the first light 653 (e.g., an RHCP light) into the light guide 610 as a first TIR propagating light 655 (e.g., an RHCP light). For illustrative purposes, FIG. 6A shows one first TIR propagating ray 655a of the first TIR propagating light 655. The first in-coupling grating 635-1 may couple the first ray 653a into the light guide 610 as the first TIR propagating ray 655a. The corresponding TIR propagating ray of the first ray 653b is not drawn in FIG. 6A.

The initial polarization of the first TIR propagating light 655 (e.g., right-handed circular polarization) may not be maintained (i.e., may change) when the first TIR propagating light 655 propagates inside the light guide 610 through TIR toward the out-coupling gratings 645-1 and 645-2. When arriving at the out-coupling gratings 645-1 and 645-2, the first TIR propagating light 655 may include a primarily portion (or a first polarized component) having the initial polarization and a secondary portion (or a second polarized component) having a polarization orthogonal to the initial polarization (i.e., changed from the initial polarization). For example, when arriving at the out-coupling gratings 645-1 and 645-2, the first TIR propagating light 655 may include a primarily portion (or a first polarized component) that is an RHCP component of the first TIR propagating light 655, and a secondary portion (or a second polarized component) that is an LHCP component of the first TIR propagating light 655. The out-coupling grating 645-1 may be configured to couple, via diffraction, the first polarized component (e.g., the RHCP component) of the first TIR propagating light 655 out of the light guide 610 as a first output light 661 (e.g., an RHCP light), and transmit, without diffraction, the second polarized component (e.g., the LHCP component) of the first TIR propagating light 655 toward the out-coupling grating 645-2. The out-coupling grating 645-2 may be configured to couple, via diffraction, the second polarized component (e.g., the LHCP component) of the first TIR propagating light 655 out of the light guide 610 as a second output light 662 (e.g., an LHCP light). The first output light 661 and the second output light 662 with orthogonal polarizations may form two images, one being a primary image formed by the first output light 661 diffracted by the out-coupling grating 645-1 and the other being a ghost image that is a mirror image formed by the second output light 662 diffracted by the out-coupling grating 645-2.

The second polarization switch 630 (e.g., SHWP) may be synchronized with the first polarization switch 623 (e.g., SHWP) to operate in the non-switching state, thereby transmitting the light 661 (e.g., an RHCP light) and the light 662 (e.g., an LHCP light) without affecting the respective polarizations. The controller 615 may control the second polarization switch 630 and the first polarization switch 623 to synchronize the operation states. In some embodiments, the second polarization switch 630 (e.g., SHWP) may be configured to maintain the polarization of the light 661 (e.g., an RHCP light), and may transmit the light 661 (e.g., an RHCP light) as a light 663 (e.g., an RHCP light). In addition, the second polarization switch 630 (e.g., SHWP) may be configured to maintain the polarization of the light 662 (e.g., an LHCP light), and transmit the light 662 (e.g., an LHCP light) as a light 664 (e.g., an LHCP light). The polarizer 640 may be configured to transmit a light forming the primary image, and block a light forming the ghost image via absorption. In some embodiments, as shown in FIG. 6A, the polarizer 640 may be an absorptive type circular polarizer configured to transmit an RHCP light and block an LHCP light via absorption. Thus, the light 663 (e.g., an RHCP light) may be transmitted through the polarizer 640 as a first output light 657 (e.g., an RHCP light) propagating toward the eye 260, and the light 664 (e.g., an LHCP light) may be blocked by the polarizer 640 via absorption. Thus, the light 664 may not be received by the eye 260. The eye 260 may observe the primary image formed by the light 661 diffracted by the out-coupling grating 645-1, and may not observe the ghost image formed by the light 662 diffracted by the out-coupling grating 645-2.

Referring to FIG. 6B, during a second sub-frame of a display frame, the light source 620 may output the light 652 toward the polarization conversion element 622. In some embodiments, the light 652 may correspond to a second portion of the FOV of the image light 650 (referred to as the second input FOV). For illustrative purposes, the light 652 may be an unpolarized light or a linearly polarized light. The polarization conversion element 622 may be configured to polarize the light 651 into a circularly polarized light (e.g., an RHCP light). The circularly polarized light (e.g., an RHCP light) may propagate toward the first polarization switch 623 (e.g., SHWP). The first polarization switch 623 (e.g., SHWP) may be configured to operate in the switching state to switch the handedness of the circularly polarized light (e.g., an RHCP light) to the opposite handedness. For example, the first polarization switch 623 (e.g., SHWP) may transmit the circularly polarized light (e.g., an RHCP light) received from the polarization conversion element 622 as a circularly polarized light with the polarization changed (e.g., an LHCP light).

As the in-coupling grating 635-1 is configured to backwardly diffract an RHCP light and transmit, with substantially zero or negligible diffraction, an LHCP light, the second light 654 (e.g., an LHCP light) may be transmitted through the in-coupling grating 635-1 toward the in-coupling grating 635-2. The in-coupling grating 635-2 may be configured to couple, via diffraction, the second light 654 (e.g., an LHCP light) into the light guide 610 as a second TIR propagating light 656 (e.g., an LHCP light). For illustrative purposes, FIG. 6B shows one second TIR propagating ray 656a of the second TIR propagating light 656. The second in-coupling grating 635-2 may couple the second ray 654a into the light guide 610 as the second TIR propagating ray 656a. The corresponding TIR propagating rays of the second ray 654b is not shown in FIG. 6B.

The initial polarization of the second TIR propagating light 656 (e.g., left-handed circular polarization) may not be maintained (i.e., may change) when the second TIR propagating light 656 propagates inside the light guide 610 through TIR toward the out-coupling gratings 645-1 and 645-2. When arriving at the out-coupling gratings 645-1 and 645-2, the second TIR propagating light 656 may include a primarily portion (or a first polarized component) having the initial polarization and a secondary portion (or a second polarized component) having a polarization orthogonal to the initial polarization. For example, when arriving at the out-coupling gratings 645-1 and 645-2, the second TIR propagating light 656 may include a primarily portion (or a first polarized component) that is an LHCP component of the second TIR propagating light 656, and a secondary portion (or a second polarized component) that is an RHCP component of the second TIR propagating light 656. The out-coupling grating 645-1 may be configured to couple, via diffraction, the first polarized component (e.g., the RHCP component) of the second TIR propagating light 656 out of the light guide 610 as a first (or a third) output light 665 (e.g., an RHCP light), and transmit, with substantially zero or negligible diffraction, the second polarized component (e.g., the LHCP component) of the second TIR propagating light 656 toward the out-coupling grating 645-2. The out-coupling grating 645-2 may be configured to couple, via diffraction, the second polarized component (e.g., the LHCP component) of the second TIR propagating light 656 out of the light guide 610 as a second (or a fourth) output light 666 (e.g., an LHCP light). The first output light 665 (e.g., an RHCP light) and the second output light 666 (e.g., an LHCP light) with orthogonal polarizations may form two images, one being a primary image formed by the second output light 666 diffracted by the out-coupling grating 645-2 and the other being a ghost image that is a mirror image formed by the first output light 665 diffracted by the out-coupling grating 645-1.

The second polarization switch 630 (e.g., SHWP) may be synchronized with the first polarization switch 623 (e.g., SHWP) to operate in the switching state. In the switching state, the second polarization switch 630 (e.g., SHWP) may be configured to switch or change a polarization of a light to an orthogonal polarization. For example, the second polarization switch 630 may switch the handedness of the first output light 665 (e.g., an RHCP light) and output a light 667 with a polarization having an opposite handedness (e.g., an LHCP light). In some embodiments, the second polarization switch 630 (e.g., SHWP) may be configured to switch the handedness of the second output light 666 (e.g., an LHCP light) and output a light 668 with a polarization having an opposite handedness (e.g., an RHCP light). As the polarizer 640 may be an absorptive type circular polarizer configured to transmit an RHCP light and block an LHCP light via absorption, the light 668 (e.g., an RHCP light) may be transmitted through the polarizer 640 as a second output light 658 (e.g., an RHCP light) propagating toward the eye 260, and the light 667 (e.g., an LHCP light) may be blocked by the polarizer 640 via absorption. Thus, the light 667 may not be received by the eye 260. The eye 260 may observe the primary image formed by the light 666 diffracted by the out-coupling grating 645-2, and may not observe the ghost image formed by the light 665 diffracted by the out-coupling grating 645-1.

Referring to FIGS. 6A and 6B, in some embodiments, the first output light 657 may be bounded by first output rays 657a and 657b. In some embodiments, the first out-coupling grating 645-1 may be configured to couple the first TIR propagating ray 655a out of the light guide 612 as a first output ray 657a at a first output angle. In some embodiments, the first in-coupling grating 635-1 may be configured to couple the first ray 653b into the light guide 610 and the first out-coupling grating 645-1 may be configured to couple the first ray 653b out of the light guide 612 as a first output ray 657b. In some embodiments, the first output light 657 may correspond to a first output FOV. The first output FOV may correspond to an angular region bounded by the first output rays 657a and 657b. The second output light 658 may be bounded by second output rays 658a and 658b. The second out-coupling grating 645-2 may be configured to couple the second TIR propagating ray 656a out of the light guide 614 as a second output ray 658a at a second output angle. In some embodiments, the second in-coupling grating 635-1 may be configured to couple the second ray 654b into the light guide 610 and the second out-coupling grating 645-2 may be configured to couple the second ray 654b out of the light guide 614 as a second output ray 658b. In some embodiments, the second output light 658 may correspond to a second output FOV. The second output FOV may correspond to an angular region bounded by the second output rays 658a and 658b. In some embodiments, the first output angle of the first output ray 657a and the second output angle of the second output ray 658a may have a same absolute value and opposite signs, e.g., opposite output angles $+\theta$ and $-\theta$. In some embodiments, the first output angle of the first output ray 657a and the second output angle of the second output ray 658a may have different absolute values and opposite signs (e.g., $+\theta 1$ and $-\theta 2$, with $\theta 1$ and $\theta 2$ having different values). In some embodiments, the first output ray 657b and the second output ray 658b may substantially overlap with each other. Thus, the FOV provided by the light guide display assembly 600 may be enlarged or expanded (e.g., doubled) compared to a conventional light guide display assembly including stacked light guides fabricated based on a material with a same or similar refractive index. Additionally or alternatively, compared with a conventional light guide, a same or similar FOV may be provided by the disclosed light guide display assembly 600 having the light guide 610 fabricated based on a material with a lower refractive index.

The first in-coupling grating 635-1, the light guide 612, and the first out-coupling grating 645-1 may be configured to provide the first output FOV at an eye-box of the light guide display assembly 600. The second in-coupling grating 635-2, the light guide 614, and the second out-coupling grating 645-2 may be configured to provide the second output FOV at the eye-box of the light guide display assembly 600. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV and the second output FOV at the output side of the light guide display assembly 600 may be larger than the predetermined FOV of the image light 650 emitted by the light source assembly 605 at the input side of the light guide display assembly 600. In some embodiments, the first TIR propagating light 655 may correspond to a first intermediate FOV that is smaller than the first input FOV of the first light 653, and the second TIR propagating light 656 may correspond to a second intermediate FOV that is smaller than the second input FOV of the second light 654. The combination of the first output FOV and the second output FOV at the output side of the light guide display assembly 600 may be larger than a combined FOV of the first intermediate FOV and the second intermediate FOV.

Figure 7A:
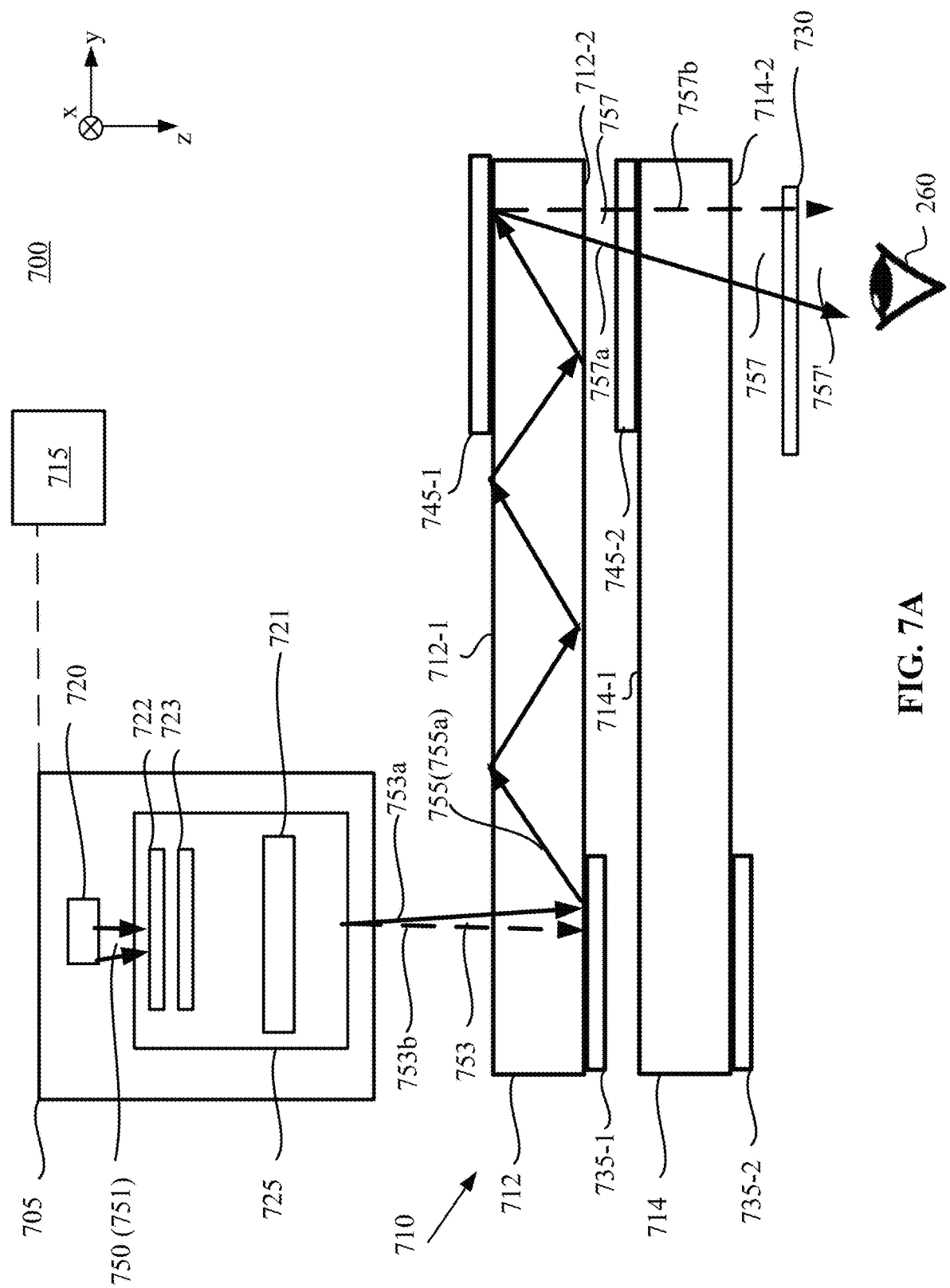
FIGS. 7A and 7B illustrate a schematic diagram of a light guide display assembly configured to provide an expanded FOV, according to another embodiment of the present disclosure.
Figure 7B:
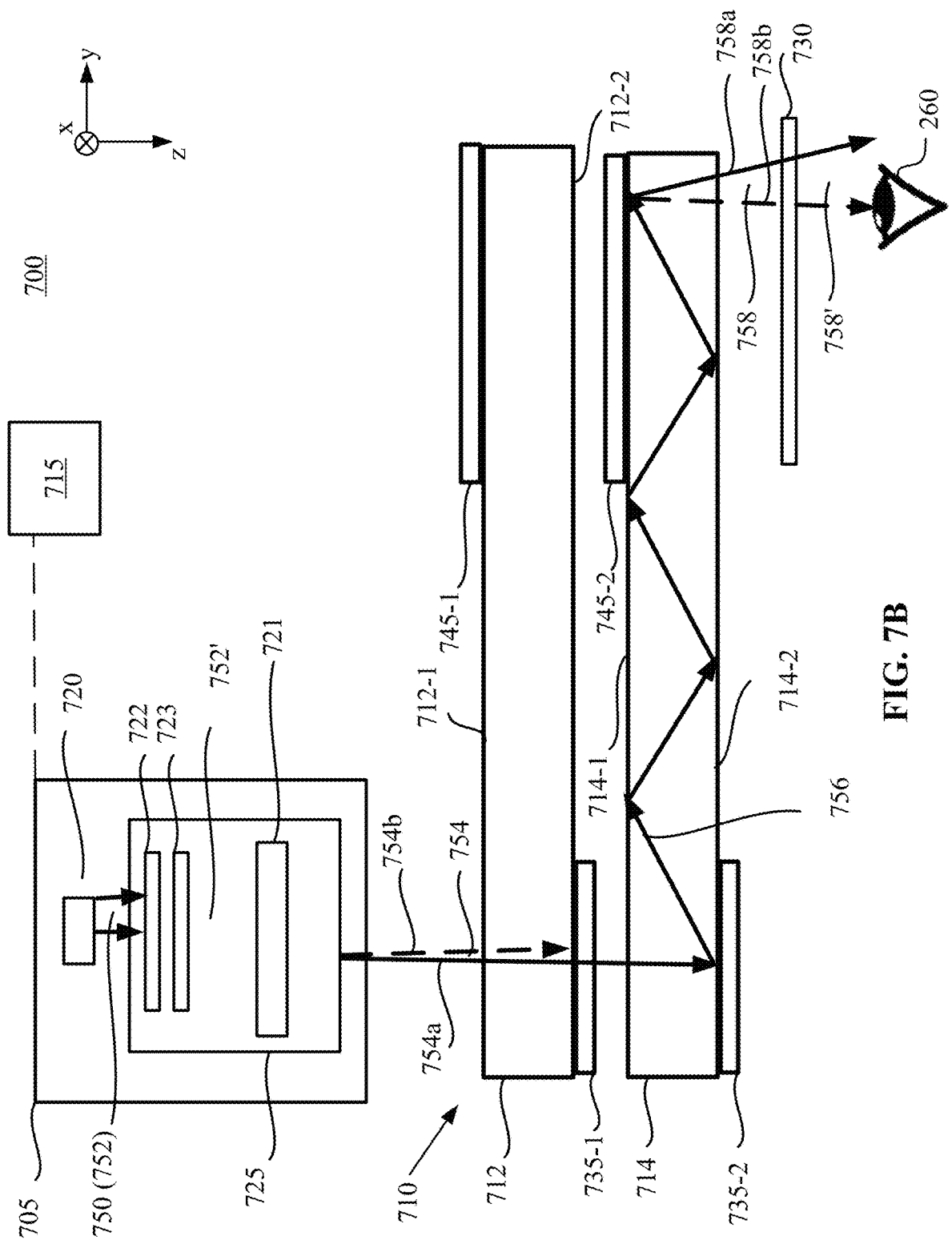

FIGS. 7A and 7B illustrate a schematic diagram of an optical device or system 700 configured to provide an expanded FOV, according to another embodiment of the present disclosure. The optical system 700 may also be referred to as a light guide display assembly 700. The light guide display assembly 700 shown in FIGS. 7A and 7B may include elements, structures, and/or functions that are the same as or similar to those included in the light guide display assembly 200 shown in FIG. 2A, the light guide display assembly 250 shown in FIG. 2B, the light guide display assembly 300 shown in FIG. 3, the light guide display assembly 400 shown in FIG. 4, the light guide display assembly 500 shown in FIG. 5, or the light guide display assembly 600 shown in FIG. 6. Descriptions of the same or similar elements, structures, and/or functions can refer to the above descriptions rendered in connection with FIG. 2A, FIG. 2B, FIG. 3, FIG. 4, FIG. 5, FIG. 6A, or FIG. 6B.

As shown in FIGS. 7A and 7B, the light guide display assembly 700 may include a light source assembly 705, a light guide stack 710, and a controller 715. The light source assembly 705 and the controller 715 may be embodiments of (or may be similar to) the light source assembly 205 and the controller 215 shown in FIGS. 2A and 2B, the light source assembly 305 and the controller 315 shown in FIG. 3, the light source assembly 405 and the controller 415 shown in FIG. 4, the light source assembly 505 and the controller 515 shown in FIG. 5, or the light source assembly 605 and the controller 615 shown in FIG. 6A and FIG. 6B. Descriptions of the light source assembly 705 and the controller 715 can refer to the above descriptions rendered in connection with FIG. 2A, 2B, 3, 4, 5, 6A, or 6B.

The light guide stack 710 may include a plurality of light guides stacked together. For illustrative purposes, FIG. 7A shows that the light guide stack 710 may include a first light guide 712 and a second light guide 714. Other suitable number of light guides may be used, such as three, four, five, etc. Each of the light guides 712 and 714 may be an embodiment of (or may be similar to) the light guide 210 shown in FIG. 2, the light guide 310 shown in FIG. 3, the light guide 410 shown in FIG. 4, the light guides 512 and 514 shown in FIG. 5, or the light guide 610 shown in FIG. 6A.

The light source assembly 705 may include a light source (e.g., an electronic display) 720 and a light conditioning system 725 including a polarization conversion element 722, a collimator 721, and a first polarization switch 723, which may be similar to the light source 620, and the light conditioning system 625 including the polarization conversion element 622, the collimator 621, and the first polarization switch 623 shown in FIG. 6A and FIG. 6B. In some embodiments, the light source 720, the polarization conversion element 722, and the collimator 721 may also be similar to the light source 520, the polarization conversion element 522, and the collimator 521 shown in FIG. 5. In some embodiments, the light source 720, the polarization conversion element 722, and the collimator 721 may also be similar to the light source 420, the polarization conversion element 422, and the collimator 421 shown in FIG. 4. In some embodiments, the light source 720, the polarization conversion element 722, and the collimator 721 may also be similar to the light source 320, the polarization conversion element 322, and the collimator 321 shown in FIG. 3. In some embodiments, the light source 720 and the light conditioning system 725 may also be similar to the light source 220 and the light conditioning system 225 shown in FIGS. 2A and 2B. Descriptions of the same or similar elements, structures, and/or functions may refer to the above descriptions rendered in connection with FIG. 2A, 2B, 3, 4, 5, 6A, or 6B.

A light with a predetermined FOV (e.g., equal to or smaller than 60°) may be configured with two orthogonally polarized portions (e.g., a first light and a second light with orthogonal polarizations). Each of the two orthogonally polarized portions may be associated with the full predetermined FOV. The light source assembly 705 may be configured to output the first and second lights with orthogonal polarizations in a time-sequential manner (e.g., during two consecutive sub-frames of a display frame), which may be realized by the first polarization switch 723 coupled to the light source 720. The light guide stack 710 may be configured to receive the first light as a first input light and the second light as a second input light during the two consecutive sub-frames, respectively.

The light guide stack 710 may include one or more in-coupling elements coupled to each light guide 712 or 714. In some embodiments, each of the in-coupling elements may be polarization selective. In some embodiments, each of the in-coupling elements include one or more gratings. For discussion purposes, each in-coupling element may be referred to as an in-coupling grating. It is understood that in other embodiments, a non-grating structure may be used as the in-coupling element. In the embodiment shown in FIG. 7A, the light guides 712 and 714 may be coupled with a first in-coupling grating 735-1 and a second in-coupling grating 735-2, respectively. The first and second in-coupling gratings 735-1 and 735-2 may be configured to couple, via diffraction, the first and second input lights into the light guides 712 and 714 during two consecutive sub-frames, respectively. The first and second input lights may propagate through TIR with a substantially same propagation angle inside the respective light guides 712 and 714. The polarizations of the first and second input lights may be maintained inside the respective light guides 712 and 714, respectively, e.g., by one or more polarization correction films similar to the polarization correction film 330 shown in FIG. 3.

The light guide stack 710 also include one or more out-coupling elements coupled to each of the light guides 712 and 714. In some embodiments, each out-coupling element may be polarization selective. In some embodiments, each of the out-coupling elements may include one or more gratings. For discussion purposes, each out-coupling element may be referred to as an out-coupling grating. It is understood that in other embodiments, a non-grating structure may be used as the in-coupling element. In the embodiment shown in FIG. 7A, the light guides 712 and 714 may be coupled with a first out-coupling grating 745-1 and a second out-coupling grating 745-2, respectively. The first and second out-coupling gratings 745-1 and 745-2 may be configured to couple, via diffraction, the first and second lights propagating inside the light guides 712 and 714 through TIR out of the light guides 712 and 714 in different directions (or at diffraction angles) during the two consecutive sub-frames, respectively. Each of the in-coupling gratings 735-1 and 735-2 and the out-coupling gratings 745-1 and 745-2 may be a transmissive type grating (e.g., a transmissive PVH) or a reflective type grating (e.g., a reflective PVH).

Referring to FIGS. 7A and 7B, in some embodiments, the light source 720 may generate an image light 750 (representing a virtual image or a display image) with a predetermined FOV (e.g., equal to or smaller than 60°), corresponding to a display image with the predetermined FOV (e.g., equal to or smaller than 60°). The image light 750 may be unpolarized or polarized. In some embodiments, the image light 750 may be a diverging light. The image light 750 may be configured with two portions (e.g., two lights) 751 and 752 each corresponding to the full predetermined FOV of the image light 750. The light source 720 may be configured to emit the two lights 751 and 752 in a time-sequential manner. For example, a display frame of the display image generated by the light source 720 may include two consecutive sub-frames, a first sub-frame and a second sub-frame. The light source 720 may be configured to emit the light 751 corresponding to the full predetermined FOV of the image light 750 during the first sub-frame, as shown in FIG. 7A, and emit the light 752 corresponding the full predetermined FOV of the image light 750 during the second sub-frame, as shown in FIG. 7B.

The light conditioning system 725 may be configured to receive the light 751 from the light source 720 and process the light 751 to output a first light 753 during the first sub-frame, as shown in FIG. 7A. The light conditioning system 725 may be configured to receive the light 752 from the light source 720 and process the light 752 to output a second light 754 during the second sub-frame, as shown in FIG. 7B. The first light 753 and the second light 754 may have orthogonal polarizations. The light first 753 and second light 754 may have a first input FOV and a second input FOV. In some embodiments, each of the first light 753 and second light 754 may be associated with a full FOV of the image light 750 generated by the light source 720. That is, the first input FOV and the second input FOV may each be the full FOV of the image light 750. The light guide stack 710 may be configured to receive the first light 753 as a first input light during the first sub-frame, as shown in FIG. 7A. The light guide stack 710 may be configured to receive the second light 754 as a second input light during the second sub-frame, as shown in FIG. 7B. In the y-z sectional view shown in FIG. 7A and FIG. 7B, the first input light 753 with the full predetermined FOV may be bounded by first rays 753a and 753b. For example, the first ray 753a may be the rightmost ray of the first input light 753, and the first ray 753b may be the leftmost ray of the first input light 753. The second input light 754 with the full predetermined FOV may be bounded by second rays 754a and 754b. For example, the second ray 754a may be the leftmost ray of the second input light 754, and the second ray 754b may be the rightmost ray of the second input light 754. In some embodiments, the second ray 754b (e.g., the rightmost ray of the second input light 754) and the first ray 753b (e.g., the leftmost ray of the first input light 753) may substantially overlap with each other.

In some embodiments, the first polarization switch 723 may be an active element configured to maintain a polarization of an incident light or switch the polarization of the incident light to an orthogonal polarization, depending on an operation state (e.g., switching or non-switching state) of the first polarization switch 723. For example, the first polarization switch 723 may be configured to maintain a handedness of a circularly polarized incident light or switch a handedness of the circularly polarized incident light to an opposite handedness, depending on the operation state (e.g., switching or non-switching state) of the first polarization switch 723. In some embodiments, the polarization conversion element 722 may be disposed between the light source 720 and the first polarization switch 723, and configured to polarize the light emitted by the light source 720 before the light is incident onto the first polarization switch 723. In some embodiments, the polarization conversion element 722 may be disposed between the first polarization switch 723 and the collimator 721, and configured to polarize the light output from the first polarization switch 723 into a predetermined polarization, e.g., a circular polarization. In some embodiments, the collimator 721 (e.g., a collimating lens) may be configured to collimate the light generated by the light source 720. For example, the collimator 721 may collimate the light output from the first polarization switch 723. In some embodiments, the polarization conversion element 722 may be omitted. In some embodiments, the first polarization switch 723 may not be a part of the light source assembly 705, and may be disposed between the light source assembly 705 and the light guide stack 710. In some embodiments, the first polarization switch 723 may not be a part of the light source assembly 705, and may be a part of the light guide stack 710. For example, the first polarization switch 723 may be disposed at a surface of one of the light guides 712 and 714 of the light guide stack 710.

In some embodiments, the first polarization switch 723 may include an SHWP. For example, the light source 720 may be configured to emit a circularly polarized light with a first handedness toward the first polarization switch 723 (e.g., SHWP). In some embodiments, the polarization conversion element 722 may be omitted. The first polarization switch 723 (e.g., SHWP) may be controlled by the controller 715 to operate in the non-switching state to maintain the handedness of the circularly polarized light. The first polarization switch 723 (e.g., SHWP) may be controlled by the controller 715 to operate in the switching state to switch the handedness of the circularly polarized light from the first handedness to a second handedness opposite to the first handedness.

In some embodiments, the light source 720 may be configured to emit a linearly polarized light, and the polarization conversion element 722 may include a QWP configured to convert the linearly polarized light to a circularly polarized light with the first handedness. The QWP may output the circularly polarized light with the first handedness to the first polarization switch 723 (e.g., SHWP). In some embodiments, the light source 720 may be configured to emit an unpolarized light, and the polarization conversion element 722 may include a linear polarizer and the QWP. The linear polarizer may be configured to convert the unpolarized light to a linearly polarized light. The QWP may be configured to convert the linearly polarized light to a circularly polarized light with the first handedness. The QWP may output the circularly polarized light with the first handedness to the first polarization switch 723 (e.g., SHWP). In some embodiments, when the light source 720 emits an unpolarized light, the combination of the linear polarizer and the QWP may be replaced by a circular polarizer.

In some embodiments, the light guide 712 may be coupled with the first in-coupling grating 735-1 and the first out-coupling grating 745-1. The light guide 714 may be coupled with the second in-coupling grating 735-2 and the second out-coupling grating 745-2. The in-coupling gratings 735-1 and 735-2 may be embodiments of (or may be similar to) the in-coupling gratings 335-1 and 335-2 shown in FIG. 3, the in-coupling gratings 435-1 and 435-2 shown in FIG. 4, the in-coupling gratings 535-1 and 535-2 shown in FIG. 5, or the in-coupling gratings 635-1 and 635-2 shown in FIG. 6A. The out-coupling gratings 745-1 and 745-2 may be embodiments of (or may be similar to) the out-coupling gratings 345-1 and 345-2 shown in FIG. 3, the out-coupling gratings 445-1 and 445-2 shown in FIG. 4, the out-coupling gratings 545-1 and 545-2 shown in FIG. 5, or the out-coupling gratings 645-1 and 645-2 shown in FIG. 6A. In some embodiments, the in-coupling gratings 735-1 and 735-2 may be reflective PVH gratings configured to backwardly diffract circularly polarized lights with opposite handednesses, and the out-coupling gratings 745-1 and 745-2 may be reflective PVH gratings configured to backwardly diffract circularly polarized lights with opposite handednesses. Each of the out-coupling gratings 745-1 and 745-2 may have the same polarization selectivity as one of the in-coupling gratings 735-1 and 735-2. For example, in some embodiments, the out-coupling grating 745-1 may have the same polarization selectivity as the in-coupling grating 735-1, and the out-coupling grating 745-2 may have the same polarization selectivity as the in-coupling grating 735-2. In some embodiments, for a wave guiding to take place in a light guide, the light guides 712 and 714 may be separated by air gaps. In some embodiments, the air gaps between the light guides 712 and 714 may be at least partially filled with a material (e.g., an adhesive) having a refractive index lower than that of the light guides.

Referring to FIG. 7A, during a first sub-frame of a display frame, the light source 720 may emit the light 751 toward the polarization conversion element 722. For illustrative purposes, the light 751 may be an unpolarized light or a linearly polarized light. The polarization conversion element 722 may be configured to polarize the light 751 into a circularly polarized light (e.g., an RHCP light). The polarization conversion element 722 may output the circularly polarized light toward the first polarization switch 723 (e.g., SHWP). The first polarization switch 723 (e.g., SHWP) may be controlled by the controller 715 to operate in the non-switching state to transmit the circularly polarized light (e.g., an RHCP light) without affecting the polarization. For example, the first polarization switch 723 (e.g., SHWP) may transmit the circularly polarized light (e.g., an RHCP light) received from the polarization conversion element 722 as a circularly polarized light (e.g., an RHCP light). The in-coupling grating 735-1 may be configured to couple, via diffraction, the first input light 753 (e.g., an RHCP light) into the light guide 712 as a first TIR propagating light 755 (e.g.,
an RHCP light). For illustrative purposes, FIG. 7A shows one first TIR propagating ray 755a of the first TIR propagating light 755. The first in-coupling grating 735-1 may couple the first ray 753a into the light guide 712 as the first TIR propagating ray 755a. The corresponding TIR propagating ray of the first ray 753b is not drawn in FIG. 7A. The initial polarization of the first TIR propagating light 755 (e.g., right-handed circular polarization) may be maintained when propagating inside the light guide 712 through TIR toward the out-coupling grating 745-1, e.g. by one or more polarization correction films similar to the polarization correction film 330 shown in FIG. 3.

The out-coupling grating 745-1 may be configured to couple, via diffraction, the first TIR propagating light 755 (e.g., an RHCP light) out of the light guide 712 as a first output light 757 (e.g., an RHCP light). As the out-coupling grating 745-2 is configured to backwardly diffract an LHCP light and transmit an RHCP light, the first output light 757 (e.g., an RHCP light) may be transmitted, with substantially zero or negligible diffraction, through the out-coupling grating 745-2 and the light guide 714 toward the eye 260. In the embodiment shown in FIG. 7A, the first output light 757 may be bounded by first output rays 757a and 757b. In some embodiments, the first output light 757 may correspond to a first output FOV. In some embodiments, the first output FOV may be larger than the full predetermined FOV of the first input light 753.

Referring to FIG. 7B, during a second sub-frame of the display frame, the light source 720 may output a light 752 toward the polarization conversion element 722. For illustrative purposes, the light 752 may be an unpolarized light or a linearly polarized light. The polarization conversion element 722 may be configured to polarize the light 751 into a circularly polarized light (e.g., an RHCP light), and may output the circularly polarized light toward the polarization switch 723 (e.g., SHWP). The polarization switch 723 (e.g., SHWP) may be configured to operate in the switching state to switch the handedness of the circularly polarized light (e.g., an RHCP light) to the opposite handedness. For example, the polarization switch 723 (e.g., SHWP) may transmit the circularly polarized light (e.g., an RHCP light) received from the polarization conversion element 722 as a circularly polarized light having an opposite handedness (e.g., an LHCP light).

As the in-coupling grating 735-1 may be configured to backwardly diffract an RHCP light and transmit an LHCP light, the second input light 754 (e.g., an LHCP light) may be transmitted, without diffraction, through the light guide 712 and the in-coupling grating 735-1 toward the in-coupling grating 735-2 without changing the polarization. The in-coupling grating 735-2 may be configured to couple, via diffraction, the second input light 754 (e.g., an LHCP light) into the light guide 714 as a second TIR propagating light 756 (e.g., an LHCP light). For illustrative purposes, FIG. 7B shows one second TIR propagating ray 756a of the second TIR propagating light 756. The second in-coupling grating 735-2 may couple the second ray 753a into the light guide 714 as the second TIR propagating ray 756a. The corresponding TIR propagating ray of the second ray 753b is not shown in FIG. 7A. The initial polarization of the first TIR propagating light 756 (e.g., left-handed circular polarization) may be maintained when propagating inside the light guide 714 through TIR toward the out-coupling grating 745-2, e.g. by one or more polarization correction films similar to the polarization correction film 330 shown in FIG. 3. The out-coupling grating 745-2 may be configured to couple, via diffraction, the second TIR propagating light 756

(e.g., an LHCP light) out of the light guide 714 as a second output light 758 (e.g., an LHCP light) propagating toward the eye 260. In the embodiment shown in FIG. 7B, the second output light 758 may be bounded by second output rays 758a and 758b. In some embodiments, the second output light 758 may correspond to a second output FOV. In some embodiments, the second output FOV may be larger than the full predetermined FOV of the second input light 754.

Referring to FIGS. 7A and 7B, in some embodiments, the first out-coupling grating 745-1 may be configured to couple the first TIR propagating ray 755a out of the light guide 712 as a first output ray 757a at a first output angle. In some embodiments, the first in-coupling grating 735-1 may be configured to couple the first ray 753b into the light guide 712 and the first out-coupling grating 745-1 may be configured to couple the first ray 753b out of the light guide 712 as a first output ray 757b. The first output FOV may correspond to an angular region bounded by the first output rays 757a and 757b. In some embodiments, the second out-coupling grating 745-2 may be configured to couple the second TIR propagating ray 756a out of the light guide 714 as a second output ray 758a at a second output angle. In some embodiments, the second in-coupling grating 735-1 may be configured to couple the second ray 754b into the light guide 712 and the second out-coupling grating 745-2 may be configured to couple the second ray 754b out of the light guide 714 as a second output ray 758b. In some embodiments, the first output angle of the first output ray 757a and the second output angle of the second output ray 758a may have a same absolute value and opposite signs, e.g., opposite output angles $+\theta$ and $-\theta$. In some embodiments, the first output angle of the first output ray 757a and the second output angle of the second output ray 758a may have different absolute values and opposite signs (e.g., $+\theta 1$ and $-\theta 2$, with $\theta 1$ and $\theta 2$ having different values). In some embodiments, the first output ray 757b and the second output ray 758b may substantially overlap with each other. Thus, the FOV provided by the light guide display assembly 700 may be enlarged or expanded (e.g., doubled) compared to a conventional light guide display assembly when the light guides included in the assemblies are fabricated based on a material having a same or similar refractive index. Alternatively or additionally, compared to a conventional light guide display assembly, a same or similar FOV may be provided by the disclosed light guide display assembly 700 with the light guides 712 and 714 fabricated based on a material having a lower refractive index.

In the embodiment shown in FIGS. 7A and 7B, the first in-coupling grating 735-1, the light guide 712, and the first out-coupling grating 745-1 may be configured to provide the first output FOV at an eye-box of the light guide display assembly 700. The second in-coupling grating 735-2, the light guide 714, and the second out-coupling grating 745-2 may be configured to provide the second output FOV at the eye-box of the light guide display assembly 700. The first output FOV and the second output FOV may be substantially non-overlapping. In some embodiments, the first FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV and the second output FOV at the output side of the light guide display assembly 700 may be larger than the predetermined FOV of the image light 750 emitted by the light source 720 at the input side of the light guide display assembly 700. In some embodiments, the first TIR propagating light 755 may correspond to a first intermediate FOV that is smaller than the first input FOV of the first input light 753, and the second TIR propagating light 756 may correspond to a second intermediate FOV that is smaller than the second input FOV of the second input light 754. The combination of the first output FOV and the second output FOV at the output side of the light guide display assembly 700 may be larger than a combination of the first intermediate FOV and the second intermediate FOV.

In some embodiments, as shown in FIG. 7A, a second polarization switch 730 may be disposed between the light guide stack 710 (e.g., the light guide 714) and the eye 260. The second polarization switch 730 may be an embodiment of (or may be similar to) the first polarization switch 723. In some embodiments, the second polarization switch 730 may be synchronized with the first polarization switch 723. In some embodiments, the second polarization switch 730 and the first polarization switch 723 may be controlled by the controller 715 to synchronize the operation states, i.e., to both operate in the switching state or non-switching state during the same sub-frame (e.g., one of the first and second sub-frames). In some embodiments, the second polarization switch 730 may not be synchronized with the first polarization switch 723. For example, the second polarization switch 730 and the first polarization switch 723 may be controlled by the controller 715 to operate in different operation states during the same sub-frame. For example, the second polarization switch 730 and the first polarization switch 723 may be controlled by the controller 715 to operate in the switching state during different sub-frames, and to operate in the non-switching state during different sub-frames.

Through controlling the second polarization switch 730 to operate in the switching-state during one of the first and second sub-frames and to operate in the non-switching state during the other of the first and second sub-frames, the eye 260 may receive two output lights with the same polarization. For example, during the first sub-frame, the second polarization switch 730 may be controlled by the controller 715 to operate in the non-switching state, thereby maintaining the polarization of the light 757 (e.g., an RHCP light) and transmitting the light 757 as a light 757' without changing the polarization (e.g., an RHCP light) to the eye 260. During the second sub-frame, the second polarization switch 730 may be controlled by the controller 715 to operate in the switching state, thereby switching the handedness of the light 758 (e.g., an LHCP light) to an opposite handedness and transmitting the light 758 as a light 758' with the polarization handedness changed (e.g., an RHCP light) to the eye 260. Thus, the eye 260 may receive two output lights 757' and 758' with the same polarization at different sub-frames. In addition to controlling the first and second polarization switches 723 and 730, the controller 715 may control various other elements included in the light guide display assembly 700, such as the light source assembly 705.

For illustrative purposes, FIGS. 2A-7B show that the light source assembly and the eye are located at opposite sides of the light guide or light guide stack. Although not shown, in some embodiments, the light source assembly and the eye may be located at the same side of the light guide or light guide stack. The light guide or light guide stack and the features of the light guide or light guide stack shown or described in various embodiments may be combined. In some embodiments, all of the in-coupling gratings and the out-coupling gratings may be the same type of polarization selective gratings, e.g., transmissive PVH gratings or reflective PVH gratings. In some embodiments, the in-coupling gratings and out-coupling gratings may include different types of polarization selective gratings, e.g., at least one of the in-coupling gratings or out-coupling gratings may be a type of grating different from the remaining gratings. For example, in the embodiment shown in FIG. 3, at least one of the in-coupling gratings (335-1 and 335-2) and the out-coupling gratings (345-1 and 345-2) may be a transmissive PVH grating, and the remaining gratings may be reflective PVH gratings. In the embodiment shown in FIG. 4, at least one of the in-coupling gratings (435-1 and 435-2) and the out-coupling gratings (445-1 and 445-2) may be a reflective PVH grating, and the remaining gratings may be transmissive PVH gratings. In the embodiment shown in FIG. 5, at least one of the in-coupling gratings (535-1 and 535-2) and the out-coupling gratings (545-1 and 545-2) may be a transmissive PVH grating, and the remaining gratings may be reflective PVH gratings. In the embodiment shown in FIGS. 6A and 6B, at least one of the in-coupling gratings (635-1 and 635-2) and the out-coupling gratings (645-1 and 645-2) may be a transmissive PVH grating, and the remaining gratings may be reflective PVH gratings. In the embodiment shown in FIGS. 7A and 7B, at least one of the in-coupling gratings (735-1 and 735-2) and the out-coupling gratings (745-1 and 745-2) may be a transmissive PVH grating, and the remaining gratings may be reflective PVH gratings.

In some embodiments, a group of in-coupling gratings and a group of out-coupling gratings may be arranged in a same manner (e.g., disposed side by side or stacked at the light guide) or in different manners. The group of in-coupling gratings may be disposed at the same side as the out-coupling gratings, or at a side different from the side where the group of out-coupling gratings are disposed. For example, in the embodiment shown in FIG. 3, one of the group of in-coupling gratings (335-1 and 335-2) and the group of out-coupling gratings (345-1 and 345-2) may be disposed side by side at the light guide 310, and the other group may be stacked at the light guide 310. In the embodiment shown in FIG. 4, one of the group of in-coupling gratings (435-1 and 435-2) and the group of out-coupling gratings (445-1 and 445-2) may be disposed side by side at the light guide 410, and the other group may be stacked at the light guide 410. In the embodiment shown in FIGS. 6A and 6B, one of the group of in-coupling gratings (635-1 and 635-2) and the group of out-coupling gratings (645-1 and 645-2) may be disposed side by side at the light guide 610, and the other group may be stacked at the light guide 610.

In some embodiments, similar to the light guide display assembly 500 shown in FIG. 5 that includes two light guides for delivering two different portions of the FOV, respectively, the light guide display assembly 400 shown in FIG. 4 may include two light guides for delivering two different portions of the FOV, respectively. In some embodiments, the light guide display assembly 600 shown in FIGS. 6A and 6B may include two light guides for delivering two different portions of the FOV, respectively. In some embodiments, the light guide display assembly 700 shown in FIGS. 7A and 7B may include one light guide for delivering two lights each corresponding to the full FOV in a time-sequential manner.

All of the embodiments shown in the figures illustrate light guide display assemblies configured to provide 1D FOV expansion, as examples for describing the principles of the FOV expansion. To achieve 2D FOV expansions, the light guide display assemblies may include additional gratings. The additional gratings may perform functions similar to the illustrated gratings, except that the direction of the FOV expansion may be in the x-axis direction (perpendicular to the illustrated expansion direction, the y-axis direction).

For example, in the light guide display assembly shown in FIG. 3, to provide 2D FOV expansion, two additional out-coupling gratings may be stacked with the out-coupling gratings 345-1 and 345-2 at the first surface 310-1. In some embodiments, the two additional out-coupling gratings may be stacked together and disposed side by side with the stack of the out-coupling gratings 345-1 and 345-2 at the first surface 310-1. In some embodiments, the two additional out-coupling gratings may be stacked together and disposed at the second surface 310-2 (opposing the stack of the two out-coupling gratings 345-1 and 345-2).

In the light guide display assembly shown in FIG. 4, to provide 2D FOV expansion, two additional out-coupling gratings may be stacked with the two out-coupling gratings 445-1 and 445-2. In some embodiments, two additional out-coupling gratings may be stacked together and disposed at the first surface 410-1 (opposing the two stacked out-coupling gratings 445-1 and 445-2). In some embodiments, two additional out-coupling gratings may be stacked together and disposed side by side with the stack of the out-coupling gratings 445-1 and 445-2. In some embodiments, two additional out-coupling gratings may be disposed side by side at the first surface 410-1. In some embodiments, two additional out-coupling gratings may be disposed side by side at the second surface 410-2 with the stack of the out-coupling gratings 445-1 and 445-4.

In the light guide display assembly shown in FIG. 5, to provide 2D FOV expansion, additional out-coupling gratings may be included. The additional out-coupling gratings may be combined with the existing out-coupling gratings in various configurations. Exemplary configurations are listed below. Other variations of the configurations can also be used. In some embodiments, an additional out-coupling grating may be stacked with the out-coupling grating 545-1, and an additional out-coupling grating may be stacked with the out-coupling grating 545-2. In some embodiments, an additional out-coupling grating may be disposed at the second surface 512-2 opposing the out-coupling grating 545-1, and an additional out-coupling grating may be disposed at the second surface 514-2 opposing the out-coupling grating 545-2. In some embodiments, an additional out-coupling grating may be disposed side by side with the out-coupling grating 545-1, and an additional out-coupling grating may be disposed side by side with the second surface 514-2.

In the light guide display assembly shown in FIG. 6A and FIG. 6B, to provide 2D FOV expansion, additional out-coupling gratings may be included. The additional out-coupling gratings may be combined with the existing out-coupling gratings in various configurations similar to those described above in connection with 2D FOV expansion based on the light guide display assembly shown in FIG. 3. In some embodiments, additional polarization conversion elements may be included.

In the light guide display assembly shown in FIG. 7A and FIG. 7B, to provide 2D FOV expansion, additional out-coupling gratings may be included. The additional out-coupling gratings may be combined with the existing in out-coupling gratings in various configurations similar to those described above in connection with 2D FOV expansion based on the light guide display assembly shown in FIG. 5. In some embodiments, additional polarization conversion elements may be included.

FIG. 8 is a flowchart illustrating a method 800 for providing an expanded FOV, according to an embodiment of the present disclosure. The method 800 may include coupling a first light having a first polarization and a first input FOV into one or more light guides as a first total internal reflection ("TIR") propagating light (step 810). For example, a first in-coupling element may couple the first light into the one or more light guides as the first TIR propagating light. The method 800 may also include coupling a second light having a second polarization and a second input FOV into the one or more light guides as a second TIR propagating light (step 820). For example, a second in-coupling element may couple the second light into the one or more light guides as the second TIR propagating light. The first polarization and the second polarization may be orthogonal polarizations. In some embodiments, the one or more light guides may include a single light guide coupled with first in-coupling element (e.g., a first in-coupling grating), the second in-coupling element (e.g., a second in-coupling grating), and one or more out-coupling elements (e.g., out-coupling gratings). The in-coupling gratings may be configured to couple, via diffraction, the first light and the second light into the light guide. In some embodiments, the one or more light guides may include two or more light guides (forming a light guide stack), each coupled with one or more in-coupling gratings and one or more out-coupling gratings. The first light may be coupled into a first light guide through one or more in-coupling gratings coupled with the first light guide. The second light may be coupled into a second light guide through one or more in-coupling gratings coupled with the second light guide. The first light and the second light may be coupled into the one or more light guides during the same sub-frame (e.g., simultaneously) or during different sub-frames (e.g., in a time-sequential manner).

The method 800 may also include coupling the first TIR propagating light out of the one or more light guides as a first output light corresponding to a first output FOV (step 830). For example, a first out-coupling element may couple the first TIR propagating light out of the one or more light guides as a first output light corresponding to the first output FOV. The method 800 may also include coupling the second TIR propagating light out of the one or more light guides as a second output light corresponding to a second output FOV (step 840). For example, the one or more out-coupling gratings coupled with the one or more light guides may couple, via diffraction, the first TIR propagating light and the second TIR propagating light out of the one or more light guides as the first output light corresponding to the first output FOV and the second output light corresponding to the second output FOV. The in-coupling elements and the out-coupling elements may be polarization selective. For example, the in-coupling elements and the out-coupling elements may include reflective or transmissive PVH gratings. Thus, lights of different polarizations (e.g., orthogonal polarizations) may be coupled into the light guide through different in-coupling gratings and coupled out of the light guide through different out-coupling gratings in different directions. The first output FOV and the second output FOV may be substantially non-overlapping. In some embodiments, the first output FOV and the second output FOV may be contiguous FOVs (e.g., 0° to +50°, 0° to −50°) that are substantially non-overlapping. A combination of the first output FOV and the second output FOV may be substantially larger than each of the first output FOV and the second output FOV. In some embodiments, the combination of the first output FOV of the first output light and the second output FOV of the second output light may be substantially larger than the first input FOV of the first light and the second input FOV of the second light coupled into the one or more light guides.

The method 800 may include other additional steps or processes. For example, in some embodiments, the method 800 may include generating the first light having the first polarization. For example, a disclosed light source assembly may generate the first light having the first polarization and may output the first light toward a first in-coupling element, which may couple the first light into the one or more light guide. The method 800 may also include generating the second light having the second polarization. For example, the disclosed light source assembly may generate the second light having the second polarization and may output the second light to a second in-coupling element that may couple the second light into the one or more light guides. The second polarization may be orthogonal to the first polarization. In some embodiments, each of the first light and the second light may correspond to a different portion of a predetermined FOV of an image light generated by the light source assembly. In some embodiments, each of the first light and the second light may correspond to substantially the entire (e.g., full) predetermined FOV. In some embodiments, the method 800 may include controlling a light source assembly by a controller to generate the first light and the second light. In some embodiments, the method 800 may include controlling the light source assembly by the controller to generate the first light and the second light during a same sub-frame (e.g., simultaneously). In some embodiments, the method 800 may include controlling the light source assembly by the controller to generate the first light and the second light in a time-sequential manner in two consecutive sub-frames of a display frame. In some embodiments, when the first light and the second light are generated during a same sub-frame, the first light and the second light may be coupled into the one or more light guides during the same sub-frame, and the first TIR propagating light and the second TIR propagating light may be coupled out of the one or more light guides during the same sub-frame. In some embodiments, when the first light and the second light are generated during two consecutive sub-frames, e.g., a first sub-frame and a second sub-frame, the first light may be coupled into the one or more light guides during the first sub-frame and the first TIR propagating light may be coupled out of the one or more light guides during the first sub-frame. The second light may be coupled into the one or more light guides during the second sub-frame and the second TIR propagating light may be coupled out of the one or more light guides during the second sub-frame.

Some portions of this description may describe the embodiments of the present disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or any combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
   a light guide;
   a first in-coupling element configured to couple a first input light into the light guide;
   a first out-coupling element configured to couple the first input light out of the light guide as a first output light having a first output field of view ("FOV");
   a second in-coupling element configured to couple a second input light into the light guide; and
   a second out-coupling element configured to couple the second input light out of the light guide as a second output light having a second output FOV substantially non-overlapping with the first output FOV,
   wherein a combination of the first and second output FOVs is larger than at least one of the first or second output FOV, and the first and second input lights have orthogonal polarizations.

2. The device of claim 1, wherein the combination of the first output FOV and the second output FOV is larger than each of the first output FOV and the second output FOV.

3. The device of claim 1, wherein:
   the light guide includes a first light guide and a second light guide arranged in a stack configuration.

4. The device of claim 3, wherein:
   the first in-coupling element is configured to couple the first input light having a first polarization into the first light guide as a first total internal reflection ("TIR") propagating light, and
   the second in-coupling element is configured to couple the second input light having a second polarization that is orthogonal to the first polarization, into the second light guide as a second TIR propagating light.

5. The device of claim 4, wherein:
   the first out-coupling element is configured to couple the first TIR propagating light having a third polarization out of the first light guide, and
   the second out-coupling element is configured to couple the second TIR propagating light having a fourth polarization orthogonal to the third polarization out of the second light guide.

6. The device of claim 1, wherein at least one of the first in-coupling element, the second in-coupling element, the first out-coupling element, or the second out-coupling element is polarization selective.

7. The device of claim 6, wherein at least one of the first in-coupling element, the second in-coupling element, the first out-coupling element, or the second out-coupling element includes a polarization selective grating or a holographic element.

8. The device of claim 6, wherein at least one of the first in-coupling element, the second in-coupling element, the first out-coupling element, or the second out-coupling element is a polarization volume hologram ("PVH") element.

9. The device of claim 1, further comprising:
one or more polarization correction films disposed at a surface of the light guide, and configured to maintain a polarization of at least one of the first input light or the second input light while the first input light or the second input light propagates inside the light guide through total internal reflection ("TIR").

10. The device of claim 1, wherein:
the first in-coupling element is configured to couple the first input light into the light guide during a first sub-frame of a display frame, and
the second in-coupling element is configured to couple the second input light into the light guide during a second sub-frame of the display frame.

11. The device of claim 10, wherein during the first sub-frame:
the first out-coupling element is configured to couple a first polarized component of the first input light out of the light guide as the first output light,
the second out-coupling element is configured to couple a second polarized component of the first input light out of the light guide as a third output light, and
the device further comprises a polarization switch configured to maintain a polarization of the first output light and a polarization of the third output light, and a polarizer configured to transmit the first output light and block the third output light.

12. The device of claim 11, wherein during the second sub-frame:
the first out-coupling element is configured to couple a first polarized component of the second input light out of the light guide as a fourth output light,
the second out-coupling element is configured to couple a second polarized component of the second input light out of the light guide as the second output light,
the polarization switch is configured to change a polarization of the second output light and change a polarization of the fourth output light, and
the polarizer is configured to block the fourth output light and transmit the second output light.

13. The device of claim 1, further comprising:
a light source assembly configured to emit the first input light having a first input FOV and the second input light having a second input FOV, wherein the first input FOV is a first portion of a predetermined FOV, and the second input FOV is a second portion of the predetermined FOV; and
a controller configured to control the light source assembly to emit the first and second input lights during a same sub-frame of a display frame or during two consecutive sub-frames of the display frame.

14. The device of claim 1, further comprising:
a light source assembly configured to emit the first input light having a first input FOV and the second input light having a second input FOV, each of the first input FOV and the second input FOV corresponding to a substantially same predetermined FOV; and
a controller configured to control the light source assembly to emit the first input light and the second input light separately during two consecutive sub-frames of a display frame.

15. The device of claim 1, further comprising:
a light source assembly configured to emit the first input light and the second input light, the light source assembly including a light source and a first polarization switch configured to switch a polarization of at least one of the first input light or the second input light emitted by the light source;
a second polarization switch configured to switch a polarization of at least one of the first output light or the second output light; and
a controller configured to synchronize operation states of the first polarization switch and the second polarization switch.

16. The device of claim 1, wherein:
the first input light has a first input FOV, and the second input light has a second input FOV, and
the combination of the first output FOV and the second output FOV is larger than at least one of the first input FOV or the second input FOV.

17. A method, comprising:
coupling, by a first in-coupling element, a first input light into a light guide, and coupling, by a first out-coupling element, the first input light out of the light guide as a first output light having a first output field of view ("FOV"); and
coupling, by a second in-coupling element, a second input light into the light guide, and coupling, by the second out-coupling element, the second input light out of the light guide as a second output light having a second output FOV substantially non-overlapping with the first output FOV,
wherein a combination of the first output FOV and the second output FOV is larger than at least one of the first output FOV or the second output FOV, and
wherein at least one of the first in-coupling element, the second in-coupling element, the first out-coupling element, or the second out-coupling element is polarization selective.

18. The method of claim 17, further comprising generating, by a light source, the first input light and the second input light during a same sub-frame of a display frame, or during two consecutive sub-frames of the display frame.

19. The method of claim 17, the first input light has a first input FOV and the second input light has a second input FOV, and each of the first input FOV and the second input FOV corresponds to a substantially same predetermined FOV.

20. The method of claim 17, the first input light has a first input FOV that is a first portion of a predetermined FOV, and the second input light has a second input FOV that is a second portion of the predetermined FOV.

* * * * *